(12) United States Patent
McMahon et al.

(10) Patent No.: US 9,412,206 B2
(45) Date of Patent: Aug. 9, 2016

(54) SYSTEMS AND METHODS FOR THE MANIPULATION OF CAPTURED LIGHT FIELD IMAGE DATA

(71) Applicant: Pelican Imaging Corporation, Mountain View, CA (US)

(72) Inventors: Andrew Kenneth John McMahon, Menlo Park, CA (US); Kartik Venkataraman, San Jose, CA (US); Robert Mullis, Santa Cruz, CA (US)

(73) Assignee: Pelican Imaging Corporation, Santa Clara, CA (US)

( * ) Notice: Subject to any disclaimer, the term of this patent is extended or adjusted under 35 U.S.C. 154(b) by 16 days.

(21) Appl. No.: 13/773,284

(22) Filed: Feb. 21, 2013

(65) Prior Publication Data

US 2013/0215108 A1 Aug. 22, 2013

Related U.S. Application Data

(60) Provisional application No. 61/601,413, filed on Feb. 21, 2012.

(51) Int. Cl.
*G06T 19/20* (2011.01)
*G06F 3/041* (2006.01)
(Continued)

(52) U.S. Cl.
CPC .............. *G06T 19/20* (2013.01); *G06F 3/013* (2013.01); *G06F 3/041* (2013.01); *G06F 3/0488* (2013.01); *G06T 19/00* (2013.01); *G06T 2200/21* (2013.01)

(58) Field of Classification Search
USPC ........................................................ 345/419
See application file for complete search history.

(56) References Cited

U.S. PATENT DOCUMENTS 4,124,798 A 11/1978 Thompson
4,198,646 A 4/1980 Alexander et al.
(Continued)

FOREIGN PATENT DOCUMENTS

CN 1839394 A 9/2006
CN 101010619 A 8/2007
(Continued)

OTHER PUBLICATIONS

Moreno-Noguer, Francesc, "Active Refocusing of Images and Videos", ACM SIGGRAPH, 2007, vol. 26, pp. 1-10, [retrieved on Aug. 8, 2015], Retrieved from the Internet <URL:http://doi.acm.org/10.1145/1276377.1276461>.*
(Continued)

*Primary Examiner* — Barry Drennan
*Assistant Examiner* — Terrell Robinson
(74) *Attorney, Agent, or Firm* — KPPB LLP

(57) ABSTRACT

Systems and methods for the manipulation of captured light fields and captured light field image data in accordance with embodiments of the invention are disclosed. In one embodiment of the invention, a system for manipulating captured light field image data includes a processor, a display, a user input device, and a memory, wherein a depth map includes depth information for one or more pixels in the image data, and wherein an image manipulation application configures the processor to display a first synthesized image, receive user input data identifying a region within the first synthesized image, determine boundary data for the identified region using the depth map, receive user input data identifying at least one action, and perform the received action using the boundary data and the captured light field image data.

26 Claims, 5 Drawing Sheets

(51) Int. Cl.
  *G06F 3/01*      (2006.01)
  *G06F 3/0488*    (2013.01)
  *G06T 19/00*     (2011.01)

(56)            References Cited

U.S. PATENT DOCUMENTS

| | | | |
|---|---|---|---|
| 4,323,925 A | 4/1982 | Abell et al. | |
| 4,460,449 A | 7/1984 | Montalbano | |
| 4,467,365 A | 8/1984 | Murayama et al. | |
| 5,005,083 A | 4/1991 | Grage | |
| 5,070,414 A | 12/1991 | Tsutsumi | |
| 5,144,448 A | 9/1992 | Hornbaker | |
| 5,327,125 A | 7/1994 | Iwase et al. | |
| 5,629,524 A | 5/1997 | Stettner et al. | |
| 5,808,350 A | 9/1998 | Jack et al. | |
| 5,832,312 A | 11/1998 | Rieger et al. | |
| 5,880,691 A | 3/1999 | Fossum et al. | |
| 5,911,008 A * | 6/1999 | Niikura | G06K 9/00711 |
| | | | 348/E5.067 |
| 5,933,190 A | 8/1999 | Dierickx et al. | |
| 5,973,844 A | 10/1999 | Burger | |
| 6,002,743 A | 12/1999 | Telymonde | |
| 6,005,607 A | 12/1999 | Uomori et al. | |
| 6,034,690 A | 3/2000 | Gallery et al. | |
| 6,069,351 A | 5/2000 | Mack | |
| 6,069,365 A | 5/2000 | Chow et al. | |
| 6,097,394 A | 8/2000 | Levoy et al. | |
| 6,124,974 A | 9/2000 | Burger | |
| 6,137,100 A | 10/2000 | Fossum et al. | |
| 6,137,535 A | 10/2000 | Meyers | |
| 6,141,048 A | 10/2000 | Meyers | |
| 6,160,909 A | 12/2000 | Melen | |
| 6,163,414 A | 12/2000 | Kikuchi et al. | |
| 6,172,352 B1 | 1/2001 | Liu et al. | |
| 6,175,379 B1 | 1/2001 | Uomori et al. | |
| 6,205,241 B1 | 3/2001 | Melen | |
| 6,239,909 B1 | 5/2001 | Hayashi et al. | |
| 6,358,862 B1 | 3/2002 | Ireland et al. | |
| 6,443,579 B1 | 9/2002 | Myers et al. | |
| 6,476,805 B1 | 11/2002 | Shum et al. | |
| 6,477,260 B1 | 11/2002 | Shimomura | |
| 6,502,097 B1 | 12/2002 | Chan et al. | |
| 6,525,302 B2 | 2/2003 | Dowski, Jr. et al. | |
| 6,563,537 B1 | 5/2003 | Kawamura et al. | |
| 6,571,466 B1 | 6/2003 | Glenn et al. | |
| 6,603,513 B1 | 8/2003 | Berezin | |
| 6,611,289 B1 | 8/2003 | Yu | |
| 6,627,896 B1 | 9/2003 | Hashimoto et al. | |
| 6,628,330 B1 | 9/2003 | Lin | |
| 6,635,941 B2 | 10/2003 | Suda | |
| 6,639,596 B1 | 10/2003 | Shum et al. | |
| 6,647,142 B1 * | 11/2003 | Beardsley | G06K 7/12 |
| | | | 235/381 |
| 6,657,218 B2 | 12/2003 | Noda | |
| 6,671,399 B1 | 12/2003 | Berestov | |
| 6,750,904 B1 | 6/2004 | Lambert | |
| 6,765,617 B1 | 7/2004 | Tangen et al. | |
| 6,771,833 B1 | 8/2004 | Edgar | |
| 6,774,941 B1 | 8/2004 | Boisvert et al. | |
| 6,795,253 B2 | 9/2004 | Shinohara | |
| 6,819,328 B1 * | 11/2004 | Moriwaki | G06T 1/60 |
| | | | 345/422 |
| 6,819,358 B1 | 11/2004 | Kagle et al. | |
| 6,879,735 B1 | 4/2005 | Portniaguine et al. | |
| 6,903,770 B1 | 6/2005 | Kobayashi et al. | |
| 6,909,121 B2 | 6/2005 | Nishikawa | |
| 6,927,922 B2 | 8/2005 | George et al. | |
| 6,958,862 B1 | 10/2005 | Joseph | |
| 7,015,954 B1 | 3/2006 | Foote et al. | |
| 7,085,409 B2 | 8/2006 | Sawhney et al. | |
| 7,161,614 B1 | 1/2007 | Yamashita et al. | |
| 7,199,348 B2 | 4/2007 | Olsen et al. | |
| 7,206,449 B2 * | 4/2007 | Raskar | G06T 5/50 |
| | | | 345/426 |
| 7,235,785 B2 | 6/2007 | Hornback et al. | |
| 7,262,799 B2 | 8/2007 | Suda | |
| 7,292,735 B2 | 11/2007 | Blake et al. | |
| 7,295,697 B1 | 11/2007 | Satoh | |
| 7,369,165 B2 | 5/2008 | Bosco et al. | |
| 7,391,572 B2 | 6/2008 | Jacobowitz et al. | |
| 7,408,725 B2 | 8/2008 | Sato | |
| 7,425,984 B2 | 9/2008 | Chen | |
| 7,606,484 B1 | 10/2009 | Richards et al. | |
| 7,633,511 B2 | 12/2009 | Shum et al. | |
| 7,639,435 B2 | 12/2009 | Chiang et al. | |
| 7,646,549 B2 | 1/2010 | Zalevsky et al. | |
| 7,657,090 B2 | 2/2010 | Omatsu et al. | |
| 7,675,080 B2 | 3/2010 | Boettiger | |
| 7,675,681 B2 | 3/2010 | Tomikawa et al. | |
| 7,706,634 B2 | 4/2010 | Schmitt et al. | |
| 7,723,662 B2 | 5/2010 | Levoy et al. | |
| 7,738,013 B2 | 6/2010 | Galambos et al. | |
| 7,782,364 B2 | 8/2010 | Smith | |
| 7,826,153 B2 | 11/2010 | Hong | |
| 7,840,067 B2 | 11/2010 | Shen et al. | |
| 7,912,673 B2 | 3/2011 | Hébert et al. | |
| 7,973,834 B2 | 7/2011 | Yang | |
| 7,986,018 B2 | 7/2011 | Rennie | |
| 7,990,447 B2 | 8/2011 | Honda et al. | |
| 8,000,498 B2 | 8/2011 | Shih et al. | |
| 8,013,904 B2 | 9/2011 | Tan et al. | |
| 8,027,531 B2 | 9/2011 | Wilburn et al. | |
| 8,044,994 B2 | 10/2011 | Vetro et al. | |
| 8,077,245 B2 | 12/2011 | Adamo et al. | |
| 8,098,297 B2 | 1/2012 | Crisan et al. | |
| 8,098,304 B2 | 1/2012 | Pinto et al. | |
| 8,106,949 B2 | 1/2012 | Tan et al. | |
| 8,126,279 B2 | 2/2012 | Marcellin et al. | |
| 8,130,120 B2 | 3/2012 | Kawabata et al. | |
| 8,131,097 B2 | 3/2012 | Lelescu et al. | |
| 8,164,629 B1 | 4/2012 | Zhang | |
| 8,169,486 B2 | 5/2012 | Corcoran et al. | |
| 8,180,145 B2 | 5/2012 | Wu et al. | |
| 8,189,065 B2 | 5/2012 | Georgiev et al. | |
| 8,189,089 B1 | 5/2012 | Georgiev | |
| 8,212,914 B2 | 7/2012 | Chiu | |
| 8,213,711 B2 | 7/2012 | Tam | |
| 8,231,814 B2 | 7/2012 | Duparre | |
| 8,242,426 B2 | 8/2012 | Ward et al. | |
| 8,244,027 B2 | 8/2012 | Takahashi | |
| 8,244,058 B1 | 8/2012 | Intwala et al. | |
| 8,254,668 B2 | 8/2012 | Mashitani et al. | |
| 8,279,325 B2 * | 10/2012 | Pitts et al. | 348/345 |
| 8,280,194 B2 | 10/2012 | Wong et al. | |
| 8,289,409 B2 | 10/2012 | Chang | |
| 8,289,440 B2 | 10/2012 | Pitts et al. | |
| 8,290,358 B1 | 10/2012 | Georgiev | |
| 8,294,099 B2 | 10/2012 | Blackwell, Jr. | |
| 8,305,456 B1 | 11/2012 | McMahon | |
| 8,315,476 B1 | 11/2012 | Georgiev et al. | |
| 8,345,144 B1 | 1/2013 | Georgiev et al. | |
| 8,360,574 B2 | 1/2013 | Ishak et al. | |
| 8,400,555 B1 | 3/2013 | Georgiev | |
| 8,406,562 B2 | 3/2013 | Bassi et al. | |
| 8,446,492 B2 | 5/2013 | Nakano et al. | |
| 8,456,517 B2 | 6/2013 | Mor et al. | |
| 8,493,496 B2 | 7/2013 | Freedman et al. | |
| 8,514,491 B2 | 8/2013 | Duparre | |
| 8,541,730 B2 | 9/2013 | Inuiya | |
| 8,542,933 B2 | 9/2013 | Venkataraman et al. | |
| 8,553,093 B2 | 10/2013 | Wong et al. | |
| 8,559,756 B2 | 10/2013 | Georgiev et al. | |
| 8,581,995 B2 | 11/2013 | Lin et al. | |
| 8,619,082 B1 | 12/2013 | Ciurea et al. | |
| 8,648,918 B2 | 2/2014 | Kauker et al. | |
| 8,655,052 B2 | 2/2014 | Spooner et al. | |
| 8,682,107 B2 | 3/2014 | Yoon et al. | |
| 8,687,087 B2 | 4/2014 | Pertsel et al. | |
| 8,692,893 B2 | 4/2014 | McMahon | |
| 8,773,536 B1 | 7/2014 | Zhang | |
| 8,780,113 B1 | 7/2014 | Ciurea et al. | |
| 8,804,255 B2 | 8/2014 | Duparre | |
| 8,830,375 B2 | 9/2014 | Ludwig | |
| 8,831,367 B2 | 9/2014 | Venkataraman et al. | |

(56) References Cited

U.S. PATENT DOCUMENTS

| | | |
|---|---|---|
| 8,842,201 B2 | 9/2014 | Tajiri |
| 8,854,462 B2 | 10/2014 | Herbin et al. |
| 8,861,089 B2 | 10/2014 | Duparre |
| 8,866,912 B2 | 10/2014 | Mullis |
| 8,866,920 B2 | 10/2014 | Venkataraman et al. |
| 8,866,951 B2 | 10/2014 | Keelan |
| 8,878,950 B2 | 11/2014 | Lelescu et al. |
| 8,885,059 B1 | 11/2014 | Venkataraman et al. |
| 8,896,594 B2 | 11/2014 | Xiong et al. |
| 8,896,719 B1 | 11/2014 | Venkataraman et al. |
| 8,902,321 B2 | 12/2014 | Venkataraman et al. |
| 8,928,793 B2 | 1/2015 | Mcmahon |
| 9,019,426 B2 | 4/2015 | Han et al. |
| 9,025,894 B2 | 5/2015 | Venkataraman et al. |
| 9,025,895 B2 | 5/2015 | Venkataraman et al. |
| 9,030,528 B2 | 5/2015 | Pesach et al. |
| 9,031,335 B2 | 5/2015 | Venkataraman et al. |
| 9,031,342 B2 | 5/2015 | Venkataraman et al. |
| 9,031,343 B2 | 5/2015 | Venkataraman et al. |
| 9,036,928 B2 | 5/2015 | Venkataraman et al. |
| 9,036,931 B2 | 5/2015 | Venkataraman et al. |
| 9,041,823 B2 | 5/2015 | Venkataraman et al. |
| 9,041,824 B2 | 5/2015 | Lelescu |
| 9,041,829 B2 | 5/2015 | Venkataraman et al. |
| 9,042,667 B2 | 5/2015 | Venkataraman et al. |
| 9,055,233 B2 | 6/2015 | Venkataraman et al. |
| 9,060,124 B2 | 6/2015 | Venkataraman et al. |
| 9,094,661 B2 | 7/2015 | Venkataraman et al. |
| 9,123,117 B2 | 9/2015 | Ciurea et al. |
| 9,123,118 B2 | 9/2015 | Ciurea et al. |
| 9,124,815 B2 | 9/2015 | Venkataraman et al. |
| 9,129,183 B2 | 9/2015 | Venkataraman et al. |
| 9,129,377 B2 | 9/2015 | Ciurea et al. |
| 9,143,711 B2 | 9/2015 | McMahon |
| 9,147,254 B2 | 9/2015 | Florian et al. |
| 9,185,276 B2 | 11/2015 | Roda et al. |
| 9,188,765 B2 | 11/2015 | Venkataraman et al. |
| 9,191,580 B2 | 11/2015 | Venkataraman et al. |
| 9,210,392 B2 | 12/2015 | Nisenzon et al. |
| 9,214,013 B2 | 12/2015 | Venkataraman et al. |
| 9,235,898 B2 | 1/2016 | Venkataraman et al. |
| 9,235,900 B2 | 1/2016 | Ciurea et al. |
| 9,240,049 B2 | 1/2016 | Ciurea et al. |
| 9,253,380 B2 | 2/2016 | Venkataraman et al. |
| 9,264,592 B2 | 2/2016 | Rodda et al. |
| 9,264,610 B2 | 2/2016 | Duparre |
| 2001/0005225 A1 | 6/2001 | Clark et al. |
| 2001/0019621 A1 | 9/2001 | Hanna et al. |
| 2001/0038387 A1 | 11/2001 | Tomooka et al. |
| 2002/0012056 A1 | 1/2002 | Trevino |
| 2002/0027608 A1 | 3/2002 | Johnson et al. |
| 2002/0039438 A1 | 4/2002 | Mori et al. |
| 2002/0057845 A1 | 5/2002 | Fossum |
| 2002/0063807 A1 | 5/2002 | Margulis |
| 2002/0087403 A1 | 7/2002 | Meyers et al. |
| 2002/0089596 A1 | 7/2002 | Yasuo |
| 2002/0094027 A1 | 7/2002 | Sato et al. |
| 2002/0101528 A1 | 8/2002 | Lee |
| 2002/0113867 A1 | 8/2002 | Takigawa et al. |
| 2002/0113888 A1 | 8/2002 | Sonoda et al. |
| 2002/0122113 A1 | 9/2002 | Foote |
| 2002/0163054 A1 | 11/2002 | Suda et al. |
| 2002/0167537 A1 | 11/2002 | Trajkovic |
| 2002/0177054 A1 | 11/2002 | Saitoh et al. |
| 2003/0025227 A1 | 2/2003 | Daniell |
| 2003/0086079 A1 | 5/2003 | Barth et al. |
| 2003/0124763 A1 | 7/2003 | Fan et al. |
| 2003/0140347 A1 | 7/2003 | Varsa |
| 2003/0179418 A1 | 9/2003 | Wengender et al. |
| 2003/0190072 A1 | 10/2003 | Adkins et al. |
| 2003/0211405 A1 | 11/2003 | Venkataraman |
| 2004/0008271 A1 | 1/2004 | Hagimori et al. |
| 2004/0012689 A1 | 1/2004 | Tinnerino |
| 2004/0027358 A1 * | 2/2004 | Nakao ........................ 345/587 |
| 2004/0047274 A1 | 3/2004 | Amanai |
| 2004/0050104 A1 | 3/2004 | Ghosh et al. |
| 2004/0056966 A1 | 3/2004 | Schechner et al. |
| 2004/0061787 A1 | 4/2004 | Liu et al. |
| 2004/0066454 A1 | 4/2004 | Otani et al. |
| 2004/0100570 A1 | 5/2004 | Shizukuishi |
| 2004/0114807 A1 | 6/2004 | Lelescu et al. |
| 2004/0151401 A1 | 8/2004 | Sawhney et al. |
| 2004/0165090 A1 | 8/2004 | Ning |
| 2004/0169617 A1 | 9/2004 | Yelton et al. |
| 2004/0170340 A1 | 9/2004 | Tipping et al. |
| 2004/0174439 A1 | 9/2004 | Upton |
| 2004/0179834 A1 | 9/2004 | Szajewski |
| 2004/0207836 A1 | 10/2004 | Chhibber et al. |
| 2004/0213449 A1 | 10/2004 | Safaee-Rad et al. |
| 2004/0218809 A1 | 11/2004 | Blake et al. |
| 2004/0234873 A1 | 11/2004 | Venkataraman |
| 2004/0240052 A1 | 12/2004 | Minefuji et al. |
| 2004/0251509 A1 | 12/2004 | Choi |
| 2004/0264806 A1 | 12/2004 | Herley |
| 2005/0006477 A1 | 1/2005 | Patel |
| 2005/0007461 A1 | 1/2005 | Chou et al. |
| 2005/0009313 A1 | 1/2005 | Suzuki et al. |
| 2005/0012035 A1 | 1/2005 | Miller |
| 2005/0036778 A1 | 2/2005 | DeMonte |
| 2005/0047678 A1 | 3/2005 | Jones et al. |
| 2005/0048690 A1 | 3/2005 | Yamamoto |
| 2005/0068436 A1 | 3/2005 | Fraenkel et al. |
| 2005/0128595 A1 | 6/2005 | Shimizu |
| 2005/0132098 A1 | 6/2005 | Sonoda et al. |
| 2005/0134712 A1 | 6/2005 | Gruhlke et al. |
| 2005/0147277 A1 | 7/2005 | Higaki et al. |
| 2005/0151759 A1 | 7/2005 | Gonzalez-Banos et al. |
| 2005/0175257 A1 | 8/2005 | Kuroki |
| 2005/0185711 A1 | 8/2005 | Pfister et al. |
| 2005/0205785 A1 | 9/2005 | Hornback et al. |
| 2005/0219363 A1 | 10/2005 | Kohler |
| 2005/0224843 A1 | 10/2005 | Boemler |
| 2005/0225654 A1 | 10/2005 | Feldman et al. |
| 2005/0275946 A1 | 12/2005 | Choo et al. |
| 2005/0286612 A1 | 12/2005 | Takanashi |
| 2006/0002635 A1 | 1/2006 | Nestares et al. |
| 2006/0007331 A1 | 1/2006 | Izumi et al. |
| 2006/0023197 A1 | 2/2006 | Joel |
| 2006/0023314 A1 | 2/2006 | Boettiger et al. |
| 2006/0033005 A1 | 2/2006 | Jerdev et al. |
| 2006/0034003 A1 | 2/2006 | Zalevsky |
| 2006/0034531 A1 | 2/2006 | Poon et al. |
| 2006/0038891 A1 | 2/2006 | Okutomi et al. |
| 2006/0049930 A1 | 3/2006 | Zruya et al. |
| 2006/0054780 A1 | 3/2006 | Garrood et al. |
| 2006/0054782 A1 | 3/2006 | Olsen et al. |
| 2006/0055811 A1 | 3/2006 | Frtiz et al. |
| 2006/0069478 A1 | 3/2006 | Iwama |
| 2006/0072029 A1 | 4/2006 | Miyatake et al. |
| 2006/0087747 A1 | 4/2006 | Ohzawa et al. |
| 2006/0098888 A1 | 5/2006 | Morishita |
| 2006/0125936 A1 | 6/2006 | Gruhike et al. |
| 2006/0138322 A1 | 6/2006 | Costello et al. |
| 2006/0152803 A1 * | 7/2006 | Provitola ..................... 359/462 |
| 2006/0157640 A1 | 7/2006 | Perlman et al. |
| 2006/0159369 A1 | 7/2006 | Young |
| 2006/0176566 A1 | 8/2006 | Boettiger et al. |
| 2006/0187338 A1 | 8/2006 | May et al. |
| 2006/0197937 A1 | 9/2006 | Bamji et al. |
| 2006/0203113 A1 | 9/2006 | Wada et al. |
| 2006/0210186 A1 | 9/2006 | Berkner |
| 2006/0214085 A1 | 9/2006 | Olsen |
| 2006/0239549 A1 | 10/2006 | Kelly et al. |
| 2006/0243889 A1 | 11/2006 | Farnworth et al. |
| 2006/0251410 A1 | 11/2006 | Trutna |
| 2006/0274174 A1 | 12/2006 | Tewinkle |
| 2006/0278948 A1 | 12/2006 | Yamaguchi et al. |
| 2006/0279648 A1 | 12/2006 | Senba et al. |
| 2007/0002159 A1 | 1/2007 | Olsen et al. |
| 2007/0024614 A1 | 2/2007 | Tam |
| 2007/0036427 A1 | 2/2007 | Nakamura et al. |
| 2007/0040828 A1 | 2/2007 | Zalevsky et al. |
| 2007/0040922 A1 | 2/2007 | McKee et al. |
| 2007/0041391 A1 | 2/2007 | Lin et al. |

(56) References Cited

U.S. PATENT DOCUMENTS

| | | |
|---|---|---|
| 2007/0052825 A1 | 3/2007 | Cho |
| 2007/0083114 A1 | 4/2007 | Yang et al. |
| 2007/0085917 A1 | 4/2007 | Kobayashi |
| 2007/0102622 A1 | 5/2007 | Olsen et al. |
| 2007/0126898 A1 | 6/2007 | Feldman |
| 2007/0127831 A1 | 6/2007 | Venkataraman |
| 2007/0139333 A1 | 6/2007 | Sato et al. |
| 2007/0146511 A1 | 6/2007 | Kinoshita et al. |
| 2007/0158427 A1 | 7/2007 | Zhu et al. |
| 2007/0159541 A1 | 7/2007 | Sparks et al. |
| 2007/0160310 A1 | 7/2007 | Tanida et al. |
| 2007/0165931 A1 | 7/2007 | Higaki |
| 2007/0171290 A1 | 7/2007 | Kroger |
| 2007/0206241 A1 | 9/2007 | Smith et al. |
| 2007/0211164 A1 | 9/2007 | Olsen et al. |
| 2007/0216765 A1 | 9/2007 | Wong et al. |
| 2007/0228256 A1 | 10/2007 | Mentzer |
| 2007/0257184 A1 | 11/2007 | Olsen et al. |
| 2007/0258006 A1 | 11/2007 | Olsen et al. |
| 2007/0258706 A1 | 11/2007 | Raskar et al. |
| 2007/0263114 A1 | 11/2007 | Gurevich et al. |
| 2007/0268374 A1 | 11/2007 | Robinson |
| 2007/0296832 A1 | 12/2007 | Ota et al. |
| 2007/0296835 A1 | 12/2007 | Olsen et al. |
| 2007/0296847 A1 | 12/2007 | Chang et al. |
| 2008/0019611 A1 | 1/2008 | Larkin |
| 2008/0025649 A1 | 1/2008 | Liu et al. |
| 2008/0030597 A1 | 2/2008 | Olsen et al. |
| 2008/0043095 A1 | 2/2008 | Vetro et al. |
| 2008/0043096 A1 | 2/2008 | Vetro et al. |
| 2008/0054518 A1 | 3/2008 | Ra et al. |
| 2008/0062164 A1 | 3/2008 | Bassi et al. |
| 2008/0079805 A1 | 4/2008 | Takagi et al. |
| 2008/0080028 A1 | 4/2008 | Bakin et al. |
| 2008/0084486 A1 | 4/2008 | Enge et al. |
| 2008/0088793 A1 | 4/2008 | Sverdrup et al. |
| 2008/0095523 A1 | 4/2008 | Schilling-Benz |
| 2008/0112059 A1 | 5/2008 | Choi et al. |
| 2008/0112635 A1 | 5/2008 | Kondo et al. |
| 2008/0118241 A1 | 5/2008 | Tekolste et al. |
| 2008/0131019 A1 | 6/2008 | Ng |
| 2008/0131107 A1 | 6/2008 | Ueno |
| 2008/0151097 A1 | 6/2008 | Chen et al. |
| 2008/0152215 A1 | 6/2008 | Horie et al. |
| 2008/0152296 A1 | 6/2008 | Oh et al. |
| 2008/0158259 A1 | 7/2008 | Kempf et al. |
| 2008/0158375 A1 | 7/2008 | Kakkori et al. |
| 2008/0158698 A1 | 7/2008 | Chang et al. |
| 2008/0187305 A1 | 8/2008 | Raskar et al. |
| 2008/0193026 A1 | 8/2008 | Horie et al. |
| 2008/0218610 A1 | 9/2008 | Chapman et al. |
| 2008/0219654 A1 | 9/2008 | Border et al. |
| 2008/0239116 A1 | 10/2008 | Smith |
| 2008/0240598 A1 | 10/2008 | Hasegawa |
| 2008/0247638 A1 | 10/2008 | Tanida et al. |
| 2008/0247653 A1 | 10/2008 | Moussavi et al. |
| 2008/0272416 A1 | 11/2008 | Yun |
| 2008/0273751 A1 | 11/2008 | Yuan et al. |
| 2008/0278591 A1 | 11/2008 | Barna et al. |
| 2008/0298674 A1 | 12/2008 | Baker et al. |
| 2008/0310501 A1 | 12/2008 | Ward et al. |
| 2009/0050946 A1 | 2/2009 | Duparre et al. |
| 2009/0052743 A1 | 2/2009 | Techmer |
| 2009/0060281 A1 | 3/2009 | Tanida et al. |
| 2009/0086074 A1 | 4/2009 | Li et al. |
| 2009/0091806 A1 | 4/2009 | Inuiya |
| 2009/0096050 A1 | 4/2009 | Park |
| 2009/0102956 A1 | 4/2009 | Georgiev |
| 2009/0109306 A1 | 4/2009 | Shan et al. |
| 2009/0128833 A1 | 5/2009 | Yahav |
| 2009/0140131 A1 | 6/2009 | Utagawa et al. |
| 2009/0152664 A1 | 6/2009 | Klem et al. |
| 2009/0167922 A1 | 7/2009 | Perlman et al. |
| 2009/0179142 A1 | 7/2009 | Duparre et al. |
| 2009/0180021 A1 | 7/2009 | Kikuchi et al. |
| 2009/0200622 A1 | 8/2009 | Tai et al. |
| 2009/0201371 A1 | 8/2009 | Matsuda et al. |
| 2009/0207235 A1 | 8/2009 | Francini et al. |
| 2009/0225203 A1 | 9/2009 | Tanida et al. |
| 2009/0237520 A1 | 9/2009 | Kaneko et al. |
| 2009/0245573 A1 * | 10/2009 | Saptharishi et al. .......... 382/103 |
| 2009/0263017 A1 | 10/2009 | Tanbakuchi |
| 2009/0268192 A1 | 10/2009 | Koenck et al. |
| 2009/0268970 A1 | 10/2009 | Babacan et al. |
| 2009/0268983 A1 | 10/2009 | Stone |
| 2009/0274387 A1 | 11/2009 | Jin |
| 2009/0284651 A1 | 11/2009 | Srinivasan |
| 2009/0297056 A1 | 12/2009 | Lelescu et al. |
| 2009/0302205 A9 | 12/2009 | Olsen et al. |
| 2009/0323195 A1 | 12/2009 | Hembree et al. |
| 2009/0323206 A1 | 12/2009 | Oliver et al. |
| 2009/0324118 A1 | 12/2009 | Maslov et al. |
| 2010/0002126 A1 | 1/2010 | Wenstrand et al. |
| 2010/0002313 A1 | 1/2010 | Duparre et al. |
| 2010/0002314 A1 | 1/2010 | Duparre |
| 2010/0013927 A1 | 1/2010 | Nixon |
| 2010/0053342 A1 | 3/2010 | Hwang et al. |
| 2010/0053600 A1 | 3/2010 | Tanida et al. |
| 2010/0060746 A9 | 3/2010 | Olsen et al. |
| 2010/0073463 A1 | 3/2010 | Momonoi et al. |
| 2010/0074532 A1 | 3/2010 | Gordon et al. |
| 2010/0085425 A1 | 4/2010 | Tan |
| 2010/0086227 A1 | 4/2010 | Sun et al. |
| 2010/0091389 A1 | 4/2010 | Henriksen et al. |
| 2010/0097491 A1 | 4/2010 | Farina et al. |
| 2010/0103259 A1 | 4/2010 | Tanida et al. |
| 2010/0103308 A1 | 4/2010 | Butterfield et al. |
| 2010/0111444 A1 | 5/2010 | Coffman |
| 2010/0118127 A1 | 5/2010 | Nam et al. |
| 2010/0128145 A1 | 5/2010 | Pitts et al. |
| 2010/0133230 A1 | 6/2010 | Henriksen et al. |
| 2010/0133418 A1 | 6/2010 | Sargent et al. |
| 2010/0141802 A1 | 6/2010 | Knight et al. |
| 2010/0142839 A1 | 6/2010 | Lakus-Becker |
| 2010/0157073 A1 | 6/2010 | Kondo et al. |
| 2010/0165152 A1 * | 7/2010 | Lim ........................ 348/240.99 |
| 2010/0166410 A1 | 7/2010 | Chang et al. |
| 2010/0177411 A1 | 7/2010 | Hegde et al. |
| 2010/0194901 A1 | 8/2010 | van Hoorebeke et al. |
| 2010/0195716 A1 | 8/2010 | Klein et al. |
| 2010/0201834 A1 | 8/2010 | Maruyama et al. |
| 2010/0202054 A1 | 8/2010 | Niederer |
| 2010/0208100 A9 | 8/2010 | Olsen et al. |
| 2010/0220212 A1 | 9/2010 | Perlman et al. |
| 2010/0231285 A1 | 9/2010 | Boomer et al. |
| 2010/0244165 A1 | 9/2010 | Lake et al. |
| 2010/0265381 A1 | 10/2010 | Yamamoto et al. |
| 2010/0265385 A1 | 10/2010 | Knight et al. |
| 2010/0281070 A1 | 11/2010 | Chan et al. |
| 2010/0302423 A1 | 12/2010 | Adams, Jr. et al. |
| 2010/0309292 A1 | 12/2010 | Ho et al. |
| 2010/0321595 A1 | 12/2010 | Chiu et al. |
| 2011/0001037 A1 | 1/2011 | Tewinkle |
| 2011/0018973 A1 | 1/2011 | Takayama |
| 2011/0019243 A1 | 1/2011 | Constant, Jr. et al. |
| 2011/0032370 A1 | 2/2011 | Ludwig |
| 2011/0043661 A1 | 2/2011 | Podoleanu |
| 2011/0043665 A1 | 2/2011 | Ogasahara |
| 2011/0043668 A1 | 2/2011 | McKinnon et al. |
| 2011/0051255 A1 | 3/2011 | Lee et al. |
| 2011/0069189 A1 | 3/2011 | Venkataraman et al. |
| 2011/0080487 A1 | 4/2011 | Venkataraman et al. |
| 2011/0108708 A1 | 5/2011 | Olsen et al. |
| 2011/0121421 A1 | 5/2011 | Charbon et al. |
| 2011/0122308 A1 | 5/2011 | Duparre |
| 2011/0128393 A1 | 6/2011 | Tavi et al. |
| 2011/0128412 A1 * | 6/2011 | Milnes et al. ............ 348/231.99 |
| 2011/0149408 A1 | 6/2011 | Hahgholt et al. |
| 2011/0149409 A1 | 6/2011 | Haugholt et al. |
| 2011/0153248 A1 | 6/2011 | Gu et al. |
| 2011/0157321 A1 | 6/2011 | Nakajima et al. |
| 2011/0176020 A1 | 7/2011 | Chang |
| 2011/0181797 A1 | 7/2011 | Galstian et al. |
| 2011/0206291 A1 | 8/2011 | Kashani et al. |

(56) References Cited

U.S. PATENT DOCUMENTS

| | | |
|---|---|---|
| 2011/0211824 A1 | 9/2011 | Georgiev et al. |
| 2011/0221599 A1 | 9/2011 | Högasten |
| 2011/0221658 A1 | 9/2011 | Haddick et al. |
| 2011/0221939 A1 | 9/2011 | Jerdev |
| 2011/0221950 A1 | 9/2011 | Oostra |
| 2011/0234841 A1 | 9/2011 | Akeley et al. |
| 2011/0241234 A1 | 10/2011 | Duparre |
| 2011/0242342 A1 | 10/2011 | Goma et al. |
| 2011/0242355 A1 | 10/2011 | Goma et al. |
| 2011/0242356 A1 | 10/2011 | Aleksic |
| 2011/0255592 A1 | 10/2011 | Sung et al. |
| 2011/0255745 A1 | 10/2011 | Hodder et al. |
| 2011/0261993 A1 | 10/2011 | Weiming et al. |
| 2011/0267348 A1 | 11/2011 | Lin et al. |
| 2011/0273531 A1 | 11/2011 | Ito et al. |
| 2011/0274366 A1 | 11/2011 | Tardif |
| 2011/0279705 A1 | 11/2011 | Kuang et al. |
| 2011/0279721 A1 | 11/2011 | McMahon |
| 2011/0285866 A1 | 11/2011 | Bhrugumalla et al. |
| 2011/0285910 A1 | 11/2011 | Bamji et al. |
| 2011/0298917 A1 | 12/2011 | Yanagita |
| 2011/0300929 A1 | 12/2011 | Tardif et al. |
| 2011/0310980 A1 | 12/2011 | Mathew |
| 2011/0316968 A1 | 12/2011 | Taguchi et al. |
| 2011/0317766 A1 | 12/2011 | Lim, II et al. |
| 2012/0012748 A1 | 1/2012 | Pain et al. |
| 2012/0026297 A1 | 2/2012 | Sato |
| 2012/0026342 A1 | 2/2012 | Yu et al. |
| 2012/0026451 A1 | 2/2012 | Nystrom |
| 2012/0039525 A1 | 2/2012 | Tian et al. |
| 2012/0044249 A1 | 2/2012 | Mashitani et al. |
| 2012/0044372 A1 | 2/2012 | Côté et al. |
| 2012/0069235 A1 | 3/2012 | Imai |
| 2012/0105691 A1 | 5/2012 | Waqas et al. |
| 2012/0113318 A1 | 5/2012 | Galstian et al. |
| 2012/0113413 A1 | 5/2012 | Miahczylowicz-Wolski et al. |
| 2012/0147139 A1 | 6/2012 | Li et al. |
| 2012/0147205 A1 | 6/2012 | Lelescu et al. |
| 2012/0153153 A1 | 6/2012 | Chang et al. |
| 2012/0154551 A1 | 6/2012 | Inoue |
| 2012/0155830 A1 | 6/2012 | Sasaki et al. |
| 2012/0170134 A1 | 7/2012 | Bolis et al. |
| 2012/0176479 A1 | 7/2012 | Mayhew et al. |
| 2012/0188389 A1 | 7/2012 | Lin et al. |
| 2012/0188420 A1 | 7/2012 | Black et al. |
| 2012/0188634 A1 | 7/2012 | Kubala et al. |
| 2012/0198677 A1 | 8/2012 | Duparre |
| 2012/0200734 A1 | 8/2012 | Tang |
| 2012/0224083 A1 | 9/2012 | Jovanovski et al. |
| 2012/0229628 A1 | 9/2012 | Ishiyama et al. |
| 2012/0249550 A1 | 10/2012 | Akeley et al. |
| 2012/0249836 A1 | 10/2012 | Ali et al. |
| 2012/0262601 A1 | 10/2012 | Choi |
| 2012/0262607 A1 | 10/2012 | Shimura et al. |
| 2012/0268574 A1 | 10/2012 | Gidon et al. |
| 2012/0287291 A1 | 11/2012 | McMahon |
| 2012/0293695 A1 | 11/2012 | Tanaka |
| 2012/0314033 A1 | 12/2012 | Lee et al. |
| 2012/0327222 A1 | 12/2012 | Ng et al. |
| 2013/0002828 A1 | 1/2013 | Ding et al. |
| 2013/0003184 A1 | 1/2013 | Duparre |
| 2013/0010073 A1 | 1/2013 | Do |
| 2013/0016885 A1 | 1/2013 | Tsujimoto et al. |
| 2013/0022111 A1 | 1/2013 | Chen et al. |
| 2013/0027580 A1 | 1/2013 | Olsen et al. |
| 2013/0033579 A1 | 2/2013 | Wajs |
| 2013/0050504 A1 | 2/2013 | Safaee-Rad et al. |
| 2013/0050526 A1 | 2/2013 | Keelan |
| 2013/0057710 A1 | 3/2013 | Mcmahon |
| 2013/0070060 A1 | 3/2013 | Chatterjee |
| 2013/0076967 A1 | 3/2013 | Brunner et al. |
| 2013/0077880 A1 | 3/2013 | Venkataraman et al. |
| 2013/0077882 A1 | 3/2013 | Venkataraman et al. |
| 2013/0088489 A1 | 4/2013 | Schmeitz et al. |
| 2013/0088637 A1 | 4/2013 | Duparre |
| 2013/0113899 A1 | 5/2013 | Morohoshi et al. |
| 2013/0120605 A1 | 5/2013 | Georgiev et al. |
| 2013/0128068 A1 | 5/2013 | Georgiev et al. |
| 2013/0128069 A1 | 5/2013 | Georgiev et al. |
| 2013/0128087 A1 | 5/2013 | Georgiev et al. |
| 2013/0128121 A1 | 5/2013 | Agarwala et al. |
| 2013/0147979 A1 | 6/2013 | McMahon et al. |
| 2013/0222556 A1 | 8/2013 | Shimada |
| 2013/0223759 A1 | 8/2013 | Nishiyama et al. |
| 2013/0229540 A1 | 9/2013 | Farina et al. |
| 2013/0259317 A1 | 10/2013 | Gaddy |
| 2013/0265459 A1 | 10/2013 | Duparre et al. |
| 2013/0274923 A1 | 10/2013 | By et al. |
| 2013/0293760 A1 | 11/2013 | Nisenzon et al. |
| 2014/0002674 A1 | 1/2014 | Duparre et al. |
| 2014/0009586 A1 | 1/2014 | McNamer et al. |
| 2014/0076336 A1 | 3/2014 | Clayton et al. |
| 2014/0079336 A1 | 3/2014 | Venkataraman et al. |
| 2014/0092281 A1 | 4/2014 | Nisenzon et al. |
| 2014/0098267 A1 | 4/2014 | Tian et al. |
| 2014/0104490 A1 | 4/2014 | Hsieh et al. |
| 2014/0118493 A1 | 5/2014 | Sali et al. |
| 2014/0118584 A1 | 5/2014 | Lee |
| 2014/0132810 A1 | 5/2014 | McMahon |
| 2014/0176592 A1 | 6/2014 | Wilburn et al. |
| 2014/0192253 A1 | 7/2014 | Laroia |
| 2014/0198188 A1 | 7/2014 | Izawa |
| 2014/0218546 A1 | 8/2014 | McMahon |
| 2014/0232822 A1 | 8/2014 | Venkataraman et al. |
| 2014/0240528 A1 | 8/2014 | Venkataraman et al. |
| 2014/0240529 A1 | 8/2014 | Venkataraman et al. |
| 2014/0253738 A1 | 9/2014 | Mullis |
| 2014/0267243 A1 | 9/2014 | Venkataraman et al. |
| 2014/0267286 A1 | 9/2014 | Duparre |
| 2014/0267633 A1 | 9/2014 | Venkataraman et al. |
| 2014/0267762 A1 | 9/2014 | Mullis et al. |
| 2014/0267890 A1 | 9/2014 | Lelescu et al. |
| 2014/0285675 A1 | 9/2014 | Mullis |
| 2014/0313315 A1 | 10/2014 | Shoham et al. |
| 2014/0321712 A1 | 10/2014 | Ciurea et al. |
| 2014/0333731 A1 | 11/2014 | Venkataraman et al. |
| 2014/0333764 A1 | 11/2014 | Venkataraman et al. |
| 2014/0333787 A1 | 11/2014 | Venkataraman et al. |
| 2014/0340539 A1 | 11/2014 | Venkataraman et al. |
| 2014/0347509 A1 | 11/2014 | Venkataraman et al. |
| 2014/0347748 A1 | 11/2014 | Duparre |
| 2014/0354773 A1 | 12/2014 | Venkataraman et al. |
| 2014/0354843 A1 | 12/2014 | Venkataraman et al. |
| 2014/0354844 A1 | 12/2014 | Venkataraman et al. |
| 2014/0354853 A1 | 12/2014 | Venkataraman et al. |
| 2014/0354854 A1 | 12/2014 | Venkataraman et al. |
| 2014/0354855 A1 | 12/2014 | Venkataraman et al. |
| 2014/0355870 A1 | 12/2014 | Venkataraman et al. |
| 2014/0368662 A1 | 12/2014 | Venkataraman et al. |
| 2014/0368683 A1 | 12/2014 | Venkataraman et al. |
| 2014/0368684 A1 | 12/2014 | Venkataraman et al. |
| 2014/0368685 A1 | 12/2014 | Venkataraman et al. |
| 2014/0368686 A1 | 12/2014 | Duparre |
| 2014/0369612 A1 | 12/2014 | Venkataraman et al. |
| 2014/0369615 A1 | 12/2014 | Venkataraman et al. |
| 2014/0376825 A1 | 12/2014 | Venkataraman et al. |
| 2014/0376826 A1 | 12/2014 | Venkataraman et al. |
| 2015/0003752 A1 | 1/2015 | Venkataraman et al. |
| 2015/0003753 A1 | 1/2015 | Venkataraman et al. |
| 2015/0009353 A1 | 1/2015 | Venkataraman et al. |
| 2015/0009354 A1 | 1/2015 | Venkataraman et al. |
| 2015/0009362 A1 | 1/2015 | Venkataraman et al. |
| 2015/0015669 A1 | 1/2015 | Venkataraman et al. |
| 2015/0035992 A1 | 2/2015 | Mullis |
| 2015/0036014 A1 | 2/2015 | Lelescu et al. |
| 2015/0036015 A1 | 2/2015 | Lelescu et al. |
| 2015/0042766 A1 | 2/2015 | Ciurea et al. |
| 2015/0042767 A1 | 2/2015 | Ciurea et al. |
| 2015/0042833 A1 | 2/2015 | Lelescu et al. |
| 2015/0049915 A1 | 2/2015 | Ciurea et al. |
| 2015/0049916 A1 | 2/2015 | Ciurea et al. |
| 2015/0049917 A1 | 2/2015 | Ciurea et al. |
| 2015/0055884 A1 | 2/2015 | Venkataraman et al. |
| 2015/0091900 A1 | 4/2015 | Yang et al. |

(56) References Cited

U.S. PATENT DOCUMENTS

| | | |
|---|---|---|
| 2015/0122411 A1 | 5/2015 | Rodda et al. |
| 2015/0124113 A1 | 5/2015 | Rodda et al. |
| 2015/0124151 A1 | 5/2015 | Rodda et al. |
| 2015/0312455 A1 | 10/2015 | Venkataraman et al. |
| 2015/0326852 A1 | 11/2015 | Duparre et al. |
| 2016/0037097 A1 | 2/2016 | Duparre |
| 2016/0044252 A1 | 2/2016 | Gabriel |
| 2016/0044257 A1 | 2/2016 | Venkataraman et al. |
| 2016/0057332 A1 | 2/2016 | Ciurea et al. |

FOREIGN PATENT DOCUMENTS

| | | | |
|---|---|---|---|
| CN | 101427372 A | | 5/2009 |
| CN | 101606086 A | | 12/2009 |
| EP | 840502 A2 | | 5/1998 |
| EP | 1201407 A2 | | 7/2002 |
| EP | 1734766 A2 | | 12/2006 |
| EP | 2026563 A1 | | 2/2009 |
| EP | 2104334 A1 | | 9/2009 |
| EP | 2336816 A2 | | 6/2011 |
| GB | 2482022 A | | 1/2012 |
| JP | 59-025483 | | 9/1984 |
| JP | 64-037177 | | 7/1989 |
| JP | 02-285772 A | | 11/1990 |
| JP | 09181913 A | | 7/1997 |
| JP | 11142609 A | | 5/1999 |
| JP | 11223708 A | | 8/1999 |
| JP | 2000209503 A | | 7/2000 |
| JP | 2002205310 A | | 7/2002 |
| JP | 2002252338 A | | 9/2002 |
| JP | 2003094445 A | | 4/2003 |
| JP | 2003163938 A | | 6/2003 |
| JP | 2004221585 A | | 8/2004 |
| JP | 2005116022 A | | 4/2005 |
| JP | 2005181460 A | | 7/2005 |
| JP | 2005295381 A | | 10/2005 |
| JP | 2005354124 A | | 12/2005 |
| JP | 2006033493 A | | 2/2006 |
| JP | 2006047944 A | | 2/2006 |
| JP | 2006258930 A | | 9/2006 |
| JP | 2007520107 A | | 7/2007 |
| JP | 2008055908 A | | 3/2008 |
| JP | 2008507874 A | | 3/2008 |
| JP | 2008258885 A | | 10/2008 |
| JP | 2009132010 A | | 6/2009 |
| JP | 2011109484 A | | 6/2011 |
| JP | 2013526801 A | | 6/2013 |
| JP | 2014521117 A | | 8/2014 |
| KR | 1020110097647 A | | 8/2011 |
| TW | 200939739 A | | 9/2009 |
| WO | 2007083579 A1 | | 7/2007 |
| WO | 2008108271 A1 | | 9/2008 |
| WO | 2008108926 A1 | | 9/2008 |
| WO | 2008150817 A1 | | 12/2008 |
| WO | 2009151903 A2 | | 12/2009 |
| WO | 2011008443 A2 | | 1/2011 |
| WO | 2011055655 A1 | | 5/2011 |
| WO | 2011063347 A2 | | 5/2011 |
| WO | 2011116203 A1 | | 9/2011 |
| WO | 2011/063347 A3 | | 10/2011 |
| WO | 2011143501 A1 | | 11/2011 |
| WO | 2012057619 A1 | | 5/2012 |
| WO | 2012057620 A2 | | 5/2012 |
| WO | 2012057621 A1 | | 5/2012 |
| WO | 2012057622 A1 | | 5/2012 |
| WO | 2012057623 A1 | | 5/2012 |
| WO | 2012057620 A3 | | 6/2012 |
| WO | 2012074361 A1 | | 6/2012 |
| WO | 2012078126 A1 | | 6/2012 |
| WO | 2012082904 A1 | | 6/2012 |
| WO | 2012155119 A1 | | 11/2012 |
| WO | 2013003276 A1 | | 1/2013 |
| WO | 2013043751 A1 | | 3/2013 |
| WO | 2013043761 A1 | | 3/2013 |
| WO | 2013049699 A1 | | 4/2013 |
| WO | 2013055960 A1 | | 4/2013 |
| WO | 2013119706 A1 | | 8/2013 |
| WO | 2013126578 A1 | | 8/2013 |
| WO | 2014052974 A2 | | 4/2014 |
| WO | 2014032020 A3 | | 5/2014 |
| WO | 2014078443 A1 | | 5/2014 |
| WO | 2014130849 A1 | | 8/2014 |
| WO | 2014133974 A1 | | 9/2014 |
| WO | 2014138695 A1 | | 9/2014 |
| WO | 2014138697 A1 | | 9/2014 |
| WO | 2014144157 A1 | | 9/2014 |
| WO | 2014145856 A1 | | 9/2014 |
| WO | 2014149403 A1 | | 9/2014 |
| WO | 2014150856 A1 | | 9/2014 |
| WO | 2014159721 A1 | | 10/2014 |
| WO | 2014159779 A1 | | 10/2014 |
| WO | 2014160142 A1 | | 10/2014 |
| WO | 2014164550 A2 | | 10/2014 |
| WO | 2014164909 A1 | | 10/2014 |
| WO | 2014165244 A1 | | 10/2014 |
| WO | 2014133974 A9 | | 4/2015 |
| WO | 2015048694 A2 | | 4/2015 |

OTHER PUBLICATIONS

Liu et al., "Virtual View Reconstruction Using Temporal Information", 2012 IEEE International Conference on Multimedia and Expo, 2012, pp. 115-120.

International Search Report and Written Opinion for International Application No. PCT/US2013/027146, completed Apr. 2, 2013, 11 pgs.

International Search Report and Written Opinion for International Application No. PCT/US13/46002, Search Completed Nov. 13, 2013, Mailed Nov. 29, 2013, 7 pgs.

International Search Report and Written Opinion for International Application No. PCT/US13/48772, Search Completed Oct. 21, 2013, Mailed Nov. 8, 2013, 6 pgs.

International Search Report and Written Opinion for International Application No. PCT/US13/56065, Search Completed Nov. 25, 2013, Mailed Nov. 26, 2013, 8 pgs.

International Search Report and Written Opinion for International Application No. PCT/US13/59991, Search Completed Feb. 6, 2014, Mailed Feb. 26, 2014, 8 pgs.

International Search Report and Written Opinion for International Application No. PCT/US2013/024987, Search Completed Mar. 27, 2013, Mailed Apr. 15, 2013, 14 pgs.

International Search Report and Written Opinion for International Application No. PCT/US2013/056502, Search Completed Feb. 18, 2014, Mailed Mar. 19, 2014, 7 pgs.

International Search Report and Written Opinion for International Application No. PCT/US2013/069932, Search Completed Mar. 14, 2014, Mailed Apr. 14, 2014, 12 pgs.

IPRP for International Application No. PCT/US2012/059813, International Filing Date Oct. 11, 2012, Search Completed Apr. 15, 2014, 7 pgs.

Search Report and Written Opinion for International Application PCT/US11/36349, mailed Aug. 22, 2011, 12 pgs.

International Search Report and Written Opinion for International Application No. PCT/US2011/64921, Report Completed Feb. 25, 2011, mailed Mar. 6, 2012, 17 pgs.

International Search Report and Written Opinion for International Application PCT/US2009/044687, completed Jan. 5, 2010, 13 pgs.

International Search Report and Written Opinion for International Application PCT/US2012/044014, completed Oct. 12, 2012, 15 pgs.

International Search Report and Written Opinion for International Application PCT/US2012/056151, completed Nov. 14, 2012, 10 pgs.

International Search Report and Written Opinion for International Application PCT/US2012/059813, completed Dec. 17, 2012, 8 pgs.

International Search Report and Written Opinion for International Application PCT/US12/37670, Mailed Jul. 18, 2012, Search Completed Jul. 5, 2012, 9 pgs.

International Search Report and Written Opinion for International Application PCT/US2012/58093, completed Nov. 15, 2012, 12 pgs.

(56) References Cited

OTHER PUBLICATIONS

Office Action for U.S. Appl. No. 12/952,106, dated Aug. 16, 2012, 12 pgs.
International Search Report and Written Opinion for International Application PCT/US13/62720, report completed Mar. 25, 2014, Mailed Apr. 21, 2014, 9 pgs.
International Search Report and Written Opinion for International Application PCT/US14/24407, report completed Jun. 11, 2014, Mailed Jul. 8, 2014, 9 pgs.
International Search Report and Written Opinion for International Application PCT/US14/25100, report completed Jul. 7, 2014, Mailed Aug. 7, 2014, 5 pgs.
International Search Report and Written Opinion for International Application PCT/US2014/022123, report completed Jun. 9, 2014, Mailed Jun. 25, 2014, 5 pgs.
International Search Report and Written Opinion for International Application PCT/US2014/23762, report completed May 30, 2014, Mailed Jul. 3, 2014, 6 pgs.
International Search Report and Written Opinion for International Application PCT/US14/17766, completed May 28, 2014, Mailed Jun. 18, 2014, 9 pgs.
International Search Report and Written Opinion for International Application PCT/US14/18084, completed May 23, 2014, Mailed Jun. 10, 2014, 12 pgs.
International Search Report and Written Opinion for International Application PCT/US14/22118, report completed Jun. 9, 2014, Mailed, Jun. 25, 2014, 5 pgs.
Chen et al., "Interactive deformation of light fields", In Proceedings of SIGGRAPH I3D 2005, pp. 139-146.
Goldman et al., "Video Object Annotation, Navigation, and Composition", In Proceedings of UIST 2008, pp. 3-12.
Gortler et al., "The Lumigraph", In Proceedings of SIGGRAPH 1996, pp. 43-54.
Hacohen et al., "Non-Rigid Dense Correspondence with Applications for Image Enhancement", ACM Transactions on Graphics, 30, 4, 2011, pp. 70:1-70:10.
Hasinoff et al., "Search-and-Replace Editing for Personal Photo Collections", Computational Photography (ICCP) 2010, pp. 1-8.
Horn et al., "LightShop: Interactive Light Field Manipulation and Rendering", In Proceedings of I3D 2007, pp. 121-128.
Isaksen et al., "Dynamically Reparameterized Light Fields", In Proceedings of SIGGRAPH 2000, pp. 297-306.
Jarabo et al., "Efficient Propagation of Light Field Edits", In Proceedings of SIACG 2011, pp. 75-80.
Lo et al., "Stereoscopic 3D Copy & Paste", ACM Transactions on Graphics, vol. 29, No. 6, Article 147, Dec. 2010, pp. 147:1-147:10.
Seitz et al., "Plenoptic Image Editing", International Journal of Computer Vision 48, 2, pp. 115-129.
Veilleux, "CCD Gain Lab: The Theory", University of Maryland, College Park—Observational Astronomy (ASTR 310), Oct. 19, 2006, pp. 1-5 (online), [retrieved on May 13, 2014]. Retrieved from the Internet <URL: http://www.astro.umd.edu/~veilleux/ASTR310/fall06/ccd_theory.pdf, 5 pgs.
Baker et al., "Limits on Super-Resolution and How to Break Them", IEEE Transactions on Pattern Analysis and Machine Intelligence, Sep. 2002, vol. 24, No. 9, pp. 1167-1183.
Bertero et al., "Super-resolution in computational imaging", Micron, 2003, vol. 34, Issues 6-7, 17 pgs.
Bishop et al., "Full-Resolution Depth Map Estimation from an Aliased Plenoptic Light Field", ACCV 2010, Part II, LNCS 6493, pp. 186-200, 2011.
Bishop et al., "Light Field Superresolution", Retrieved from http://home.eps.hw.ac.uk/~sz73/ICCP09/LightFieldSuperresolution.pdf, 9 pgs.
Bishop et al., "The Light Field Camera: Extended Depth of Field, Aliasing, and Superresolution", IEEE Transactions on Pattern Analysis and Machine Intelligence, May 2012, vol. 34, No. 5, pp. 972-986.
Borman, "Topics in Multiframe Superresolution Restoration", Thesis of Sean Borman, Apr. 2004, 282 pgs.
Borman et al, "Image Sequence Processing", Source unknown, Oct. 14, 2002, 81 pgs.
Borman et al., "Block-Matching Sub-Pixel Motion Estimation from Noisy, Under-Sampled Frames—An Empirical Performance Evaluation", Proc SPIE, Dec. 1998, 3653, 10 pgs.
Borman et al., "Image Resampling and Constraint Formulation for Multi-Frame Super-Resolution Restoration", Proc. SPIE, Jun. 2003, 5016, 12 pgs.
Borman et al., "Linear models for multi-frame super-resolution restoration under non-affine registration and spatially varying PSF", Proc. SPIE, May 2004, vol. 5299, 12 pgs.
Borman et al., "Nonlinear Prediction Methods for Estimation of Clique Weighting Parameters in NonGaussian Image Models", Proc. SPIE, 1998. 3459, 9 pgs.
Borman et al., "Simultaneous Multi-Frame MAP Super-Resolution Video Enhancement Using Spatio-Temporal Priors", Image Processing, 1999, ICIP 99 Proceedings, vol. 3, pp. 469-473.
Borman et al., "Super-Resolution from Image Sequences—A Review", Circuits & Systems, 1998, pp. 374-378.
Bose et al., "Superresolution and Noise Filtering Using Moving Least Squares", IEEE Transactions on Image Processing, date unknown, 21 pgs.
Boye et al., "Comparison of Subpixel Image Registration Algorithms", Proc. of SPIE—IS&T Electronic Imaging, vol. 7246, pp. 72460X-1-72460X-9.
Bruckner et al., "Artificial compound eye applying hyperacuity", Optics Express, Dec. 11, 2006, vol. 14, No. 25, pp. 12076-12084.
Bruckner et al., "Driving microoptical imaging systems towards miniature camera applications", Proc. SPIE, Micro-Optics, 2010, 11 pgs.
Bruckner et al., "Thin wafer-level camera lenses inspired by insect compound eyes", Optics Express, Nov. 22, 2010, vol. 18, No. 24, pp. 24379-24394.
Capel, "Image Mosaicing and Super-resolution", [online], Retrieved on Nov. 10, 2012. Retrieved from the Internet at URL:<http://citeseerx.ist.psu.edu/viewdoc/download?doi=10.1.1.226.2643&rep=rep1&type=pdf>, Title pg., abstract, table of contents, pp. 1-263 (269 total pages), 2001.
Chan et al., "Extending the Depth of Field in a Compound-Eye Imaging System with Super-Resolution Reconstruction", Proceedings—International Conference on Pattern Recognition, 2006, vol. 3, pp. 623-626.
Chan et al., "Investigation of Computational Compound-Eye Imaging System with Super-Resolution Reconstruction", IEEE, ISASSP 2006, pp. 1177-1180.
Chan et al., "Super-resolution reconstruction in a computational compound-eye imaging system", Multidim. Syst. Sign Process, 2007, vol. 18, pp. 83-101.
Drouin et al., "Fast Multiple-Baseline Stereo with Occlusion", Proceedings of the Fifth International Conference on 3-D Digital Imaging and Modeling, 2005, 8 pgs.
Drouin et al., "Geo-Consistency for Wide Multi-Camera Stereo", Proceedings of the 2005 IEEE Computer Society Conference on Computer Vision and Pattern Recognition, 2005, 8 pgs.
Drouin et al., "Improving Border Localization of Multi-Baseline Stereo Using Border-Cut", International Journal of Computer Vision, Jul. 2009, vol. 83, Issue 3, 8 pgs.
Duparre et al., "Artificial apposition compound eye fabricated by micro-optics technology", Applied Optics, Aug. 1, 2004, vol. 43, No. 22, pp. 4303-4310.
Duparre et al., "Artificial compound eye zoom camera", Bioinspiration & Biomimetics, 2008, vol. 3, pp. 1-6.
Duparre et al., "Artificial compound eyes—different concepts and their application to ultra flat image acquisition sensors", MOEMS and Miniaturized Systems IV, Proc. SPIE 5346, Jan. 2004, pp. 89-100.
Duparre et al., "Chirped arrays of refractive ellipsoidal microlenses for aberration correction under oblique incidence", Optics Express, Dec. 26, 2005, vol. 13, No. 26, pp. 10539-10551.
Duparre et al., "Micro-optical artificial compound eyes", Bioinspiration & Biomimetics, 2006, vol. 1, pp. R1-R16.

(56) References Cited

OTHER PUBLICATIONS

Duparre et al., "Microoptical artificial compound eyes—from design to experimental verification of two different concepts", Proc. of SPIE, Optical Design and Engineering II, vol. 5962, pp. 59622A-1-59622A-12.
Duparre et al., "Microoptical Artificial Compound Eyes—Two Different Concepts for Compact Imaging Systems", 11th Microoptics Conference, Oct. 30-Nov. 2, 2005, 2 pgs.
Duparre et al., "Microoptical telescope compound eye", Optics Express, Feb. 7, 2005, vol. 13, No. 3, pp. 889-903.
Duparre et al., "Micro-optically fabricated artificial apposition compound eye", Electronic Imaging—Science and Technology, Prod. SPIE 5301, Jan. 2004, pp. 25-33.
Duparre et al., "Novel Optics/Micro-Optics for Miniature Imaging Systems", Proc. of SPIE, 2006, vol. 6196, pp. 619607-1-619607-15.
Duparre et al., "Theoretical analysis of an artificial superposition compound eye for application in ultra flat digital image acquisition devices", Optical Systems Design, Proc. SPIE 5249, Sep. 2003, pp. 408-418.
Duparre et al., "Thin compound-eye camera", Applied Optics, May 20, 3005, vol. 44, No. 15, pp. 2949-2956.
Duparre et al., "Ultra-Thin Camera Based on Artificial Apposistion Compound Eyes", 10th Microoptics Conference, Sep. 1-3, 2004, 2 pgs.
Fanaswala, "Regularized Super-Resolution of Multi-View Images", Retrieved on Nov. 10, 2012. Retrieved from the Internet at URL:<http://www.site.uottawa.ca/-edubois/theses/Fanaswala_thesis.pdf>, 163 pgs., Aug. 2009.
Farrell et al., "Resolution and Light Sensitivity Tradeoff with Pixel Size", Proceedings of the SPIE Electronic Imaging 2006 Conference, 2006, vol. 6069, 8 pgs.
Farsiu et al., "Advances and Challenges in Super-Resolution", International Journal of Imaging Systems and Technology, 2004, vol. 14, pp. 47-57.
Farsiu et al., "Fast and Robust Multiframe Super Resolution", IEEE Transactions on Image Processing, Oct. 2004, vol. 13, No. 10, pp. 1327-1344.
Farsiu et al., "Multiframe Demosaicing and Super-Resolution of Color Images", IEEE Transactions on Image Processing, Jan. 2006, vol. 15, No. 1, pp. 141-159.
Feris et al., "Multi-Flash Stereopsis: Depth Edge Preserving Stereo with Small Baseline Illumination", IEEE Trans on PAMI, 2006, 31 pgs.
Fife et al., "A 3D Multi-Aperture Image Sensor Architecture", Custom Integrated Circuits Conference, 2006, CICC '06, IEEE, pp. 281-284.
Fife et al., "A 3MPixel Multi-Aperture Image Sensor with 0.7Mu Pixels in 0.11Mu CMOS", ISSCC 2008, Session 2, Image Sensors & Technology, 2008, pp. 48-50.
Fischer et al., Optical System Design, 2nd Edition, SPIE Press, pp. 191-198.
Fischer et al., Optical System Design, 2nd Edition, SPIE Press, pp. 49-58.
Hamilton, "JPEG File Interchange Format, Version 1.02", Sep. 1, 1992, 9 pgs.
Hardie, "A Fast Image Super-Algorithm Using an Adaptive Wiener Filter", IEEE Transactions on Image Processing, Dec. 2007, vol. 16, No. 12, pp. 2953-2964.
Horisaki et al., "Irregular Lens Arrangement Design to Improve Imaging Performance of Compound-Eye Imaging Systems", Applied Physics Express, 2010, vol. 3, pp. 022501-1-022501-3.
Horisaki et al., "Superposition Imaging for Three-Dimensionally Space-Invariant Point Spread Functions", Applied Physics Express, 2011, vol. 4, pp. 112501-1-112501-3.
Kang et al., "Handling Occlusions inn Dense Multi-View Stereo", Computer Vision and Pattern Recognition, 2001, vol. 1, pp. 1-103-1-110.
Kitamura et al., "Reconstruction of a high-resolution image on a compound-eye image-capturing system", Applied Optics, Mar. 10, 2004, vol. 43, No. 8, pp. 1719-1727.
Krishnamurthy et al., "Compression and Transmission of Depth Maps for Image-Based Rendering", Image Processing, 2001, pp. 828-831.
Kutulakos et al., "Occluding Contour Detection Using Affine Invariants and Purposive Viewpoint Control", Proc., CVPR 94, 8 pgs.
Lensvector, "How LensVector Autofocus Works", http://www.lensvector.com/overview.html.
Levoy, "Light Fields and Computational Imaging", IEEE Computer Society, Aug. 2006, pp. 46-55.
Levoy et al., "Light Field Rendering", Proc. ADM SIGGRAPH '96, pp. 1-12.
Li et al., "A Hybrid Camera for Motion Deblurring and Depth Map Super-Resolution," Jun. 23-28, 2008, IEEE Conference on Computer Vision and Pattern Recognition, 8 pgs. Retrieved from www.eecis.udel.edu/~jye/lab_research/08/deblur-feng.pdf on Feb. 5, 2014.
Muehlebach, "Camera Auto Exposure Control for VSLAM Applications", Studies on Mechatronics.
Nayar, "Computational Cameras: Redefining the Image", IEEE Computer Society, Aug. 2006, pp. 30-38.
Ng, "Digital Light Field Photography", Thesis, Jul. 2006, 203 pgs.
Ng et al., "Super-Resolution Image Restoration from Blurred Low-Resolution Images", Journal of Mathematical Imaging and Vision, 2005, vol. 23, pp. 367-378.
Nitta et al., "Image reconstruction for thin observation module by bound optics by using the iterative backprojection method", Applied Optics, May 1, 2006, vol. 45, No. 13, pp. 2893-2900.
Nomura et al., "Scene Collages and Flexible Camera Arrays", Proceedings of Eurographics Symposium on Rendering, 2007, 12 pgs.
Park et al., "Super-Resolution Image Reconstruction", IEEE Signal Processing Magazine, May 2003, pp. 21-36.
Pham et al., "Robust Super-Resolution without Regularization", Journal of Physics: Conference Series 124, 2008, pp. 1-19.
Polight, "Designing Imaging Products Using Reflowable Autofocus Lenses", http://www.polight.no/tunable-polymer-autofocus-lens-html--11.html.
Protter et al., "Generalizing the Nonlocal-Means to Super-Resolution Reconstruction", IEEE Transactions on Image Processing, Jan. 2009, vol. 18, No. 1, pp. 36-51.
Radtke et al., "Laser lithographic fabrication and characterization of a spherical artificial compound eye", Optics Express, Mar. 19, 2007, vol. 15, No. 6, pp. 3067-3077.
Rander et al., "Virtualized Reality: Constructing Time-Varying Virtual Worlds From Real World Events", Proc. of IEEE Visualization '97, Phoenix, Arizona, Oct. 19-24, 1997, pp. 277-283, 552.
Rhemann et al, "Fast Cost-Volume Filtering for Visual Correspondence and Beyond", IEEE Trans. Pattern Anal. Mach. Intell, 2013, vol. 35, No. 2, pp. 504-511.
Robertson et al., "Dynamic Range Improvement Through Multiple Exposures", In Proc. of the Int. Conf. on Image Processing, 1999, 5 pgs.
Robertson et al., "Estimation-theoretic approach to dynamic range enhancement using multiple exposures", Journal of Electronic Imaging, Apr. 2003, vol. 12, No. 2, pp. 219-228.
Roy et al., "Non-Uniform Hierarchical Pyramid Stereo for Large Images", Computer and Robot Vision, 2007, pp. 208-215.
Sauer et al., "Parallel Computation of Sequential Pixel Updates in Statistical Tomographic Reconstruction", ICIP 1995, pp. 93-96.
Shum et al., "Pop-Up Light Field: An Interactive Image-Based Modeling and Rendering System," Apr. 2004, ACM Transactions on Graphics, vol. 23, No. 2, pp. 143-162. Retrieved from http://131.107.65.14/en-us/um/people/jiansun/papers/PopupLightField_TOG.pdf on Feb. 5.
Stollberg et al., "The Gabor superlens as an alternative wafer-level camera approach inspired by superposition compound eyes of nocturnal insects", Optics Express, Aug. 31, 2009, vol. 17, No. 18, pp. 15747-15759.
Sun et al., "Image Super-Resolution Using Gradient Profile Prior", Source and date unknown, 8 pgs.
Takeda et al., "Super-resolution Without Explicit Subpixel Motion Estimation", IEEE Transaction on Image Processing, Sep. 2009, vol. 18, No. 9, pp. 1958-1975.

(56) References Cited

OTHER PUBLICATIONS

Tanida et al., "Color imaging with an integrated compound imaging system", Optics Express, Sep. 8, 2003, vol. 11, No. 18, pp. 2109-2117.
Tanida et al., "Thin observation module by bound optics (TOMBO): concept and experimental verification", Applied Optics, Apr. 10, 2001, vol. 40, No. 11, pp. 1806-1813.
Taylor, "Virtual camera movement: The way of the future?", American Cinematographer 77, (Sep. 9), 93-100.
Vaish et al., , "Reconstructing Occluded Surfaces Using Synthetic Apertures: Stereo, Focus and Robust Measures", Proceeding, CVPR '06 Proceedings of the 2006 IEEE Computer Society Conference on Computer Vision and Pattern Recognition—vol. 2, pp. 2331-2338.
Vaish et al., "Synthetic Aperture Focusing Using a Shear-Warp Factorization of the Viewing Transform", IEEE Workshop on A3DISS, CVPR, 2005, 8 pgs.
Vaish et al., "Using Plane + Parallax for Calibrating Dense Camera Arrays", IEEE Conference on Computer Vision and Pattern Recognition (CVPR), 2004, 8 pgs.
Vuong et al., "A New Auto Exposure and Auto White-Balance Algorithm to Detect High Dynamic Range Conditions Using CMOS Technology".
Wang, "Calculation of Image Position, Size and Orientation Using First Order Properties", 10 pgs.
Wetzstein et al., "Computational Plenoptic Imaging", Computer Graphics Forum, 2011, vol. 30, No. 8, pp. 2397-2426.
Wheeler et al., "Super-Resolution Image Synthesis Using Projections Onto Convex Sets in the Frequency Domain", Proc. SPIE, 2005, 5674, 12 pgs.
Wikipedia, "Polarizing Filter (Photography)".
Wilburn, "High Performance Imaging Using Arrays of Inexpensive Cameras", Thesis of Bennett Wilburn, Dec. 2004, 128 pgs.
Wilburn et al., "High Performance Imaging Using Large Camera Arrays", ACM Transactions on Graphics, Jul. 2005, vol. 24, No. 3, pp. 765-776.
Wilburn et al., "High-Speed Videography Using a Dense Camera Array", Proceeding, CVPR'04 Proceedings of the 2004 IEEE Computer Society Conference on Computer Vision and Pattern Recognition, pp. 294-301.
Wilburn et al., "The Light Field Video Camera", Proceedings of Media Processors 2002, SPIE Electronic Imaging, 2002, 8 pgs.
Wippermann et al., "Design and fabrication of a chirped array of refractive ellipsoidal micro-lenses for an apposition eye camera objective", Proceedings of SPIE, Optical Design and Engineering II, Oct. 15, 2005, 59622C-1-59622C11.
Yang et al., "A Real-Time Distributed Light Field Camera", Eurographics Workshop on Rendering (2002)pp. 1-10.
Yang et al., "Superresolution Using Preconditioned Conjugate Gradient Method", Source and date unknown, 8 pgs.
Zhang et al., "A Self-Reconfigurable Camera Array", Eurographics Symposium on Rendering, 2004, 12 pgs.
Zomet et al., "Robust Super-Resolution", IEEE, 2001, pp. 1-6.
US 8,957,977, 2/2015, Venkataraman et al. (withdrawn).
US 8,964,053, 2/2015, Venkataraman et al. (withdrawn).
US 8,965,058, 2/2015, Venkataraman et al. (withdrawn).
Extended European Search Report for European Application EP12835041.0, Report Completed Jan. 28, 2015, Mailed Feb. 4, 2015, 6 Pgs.
International Preliminary Report on Patentability for International Application PCT/US2013/039155, completed Nov. 4, 2014, Mailed Nov. 13, 2014, 10 Pgs.
International Preliminary Report on Patentability for International Application PCT/US2013/048772, completed Dec. 31, 2014, Mailed Jan. 8, 2015, 8 Pgs.
International Preliminary Report on Patentability for International Application PCT/US2014/023762, Report Completed Mar. 2, 2015, Mailed Mar. 9, 2015, 10 Pgs.
International Search Report and Written Opinion for International Application No. PCT/US2013/039155, Search completed Jul. 1, 2013, Mailed Jul. 11, 2013, 11 Pgs.
International Search Report and Written Opinion for International Application PCT/US14/17766, report completed May 28, 2014, Mailed Jun. 18, 2014, 9 Pgs.
International Search Report and Written Opinion for International Application PCT/US14/18084, Report completed May 23, 2014, Mailed Jun. 10, 2014, 12 pgs.
International Search Report and Written Opinion for International Application PCT/US2014/030692, report completed Jul. 28, 2014, Mailed Aug. 27, 2014, 7 Pages.
International Preliminary Report on Patentability for International Application PCT/US13/56065, Report Issued Feb. 24, 2015, Mailed Mar. 5, 2015, 4 Pgs4 Pages.
International Preliminary Report on Patentability for International Application PCT/US2013/056502, Report Issued Feb. 24, 2015, Mailed Mar. 5, 2015, 7 Pgs7-Pages.
Joshi, et al., "Synthetic Aperture Tracking: Tracking Through Occlusions", I CCV IEEE 11th International Conference on Computer Vision; Publication [online]. Oct. 2007 [retrieved Jul. 28, 2014]. Retrieved from the Internet: <URL: http:I/ieeexplore.ieee.org/stamp/stamp.jsp?tp=&arnumber=4409032&isnumber=4408819>; pp. 1-8.
Zhang, Qiang et al., "Depth estimation, spatially variant image registration, and super-resolution using a multi-lenslet camera", Proceedings of SPIE, vol. 7705, Apr. 23, 2010, pp. 770505-770505-8, XP055113797 ISSN: 0277-786X, DOI: 10.1117/12.852171.
US 9,014,491, 4/2015, Venkataraman et al. (withdrawn).
Extended European Search Report for European Application EP12782935.6, report completed Aug. 28, 2014 Mailed Sep. 4, 2014, 6 Pgs.
Extended European Search Report for European Application EP12804266.0, Report Completed Jan. 27, 2015, Mailed Feb. 3, 2015, 6 Pgs.
International Preliminary Report on Patentability for International Application No. PCT/US2013/059991, Report Issued Mar. 17, 2015, Mailed Mar. 26, 2015, 8 pgs.
International Preliminary Report on Patentability for International Application PCT/US13/62720, Report Issued Mar. 31, 2015, Mailed Apr. 9, 2015, 8 Pgs.
International Preliminary Report on Patentability for International Application PCT/US2013/024987, Mailed Aug. 21, 2014, 13 Pgs.
International Preliminary Report on Patentability for International Application PCT/US2013/027146, International Filing Date Feb. 21, 2013, Report Completed Apr. 2, 2013, Report Issued Aug. 26, 2014, 10 pages.
International Preliminary Report on Patentability for International Application PCT/US2013/046002, Report issued Dec. 31, 2014, Mailed Jan. 8, 2015, 6 Pgs.
International Preliminary Report on Patentability for International Application PCT/US2013/069932, Report issued May 19, 2015, Mailed May 28, 2015, 12 Pgs.
International Preliminary Report on Patentability for International Application PCT/US2014/018084, Report issued Aug. 25, 2015, Mailed Sep. 3, 2015, 11 Pgs.
International Preliminary Report on Patentability for International Application PCT/US2014/018116, Report issued Sep. 15, 2015, Mailed Sep. 24, 2015, 12 Pgs.
International Preliminary Report on Patentability for International Application PCT/US2014/022118, Report issued Sep. 8, 2015, Mailed Sep. 17, 2015, 4pgs.
International Preliminary Report on Patentability for International Application PCT/US2014/022123, Report issued Sep. 8, 2015, Mailed Sep. 17, 2015, 4 Pgs.
International Preliminary Report on Patentability for International Application PCT/US2014/024407, Report issued Sep. 15, 2015, Mailed Sep. 24, 2015, 8 Pgs.
International Preliminary Report on Patentability for International Application PCT/US2014/025100, Report issued Sep. 15, 2015, Mailed Sep. 24, 2015, 4 Pgs.
International Search Report and Written Opinion for International Application No. PCT/US2009/044687, date completed Jan. 5, 2010, date mailed Jan. 13, 2010, 9 pgs.
International Search Report and Written Opinion for International Application No. PCT/US2013/027146, completed Apr. 2, 2013, 12 pgs.

(56) References Cited

OTHER PUBLICATIONS

International Search Report and Written Opinion for International Application PCT/US14/024903 report completed Jun. 12, 2014, Mailed, Jun. 27, 2014, 13 pgs.

International Search Report and Written Opinion for International Application PCT/US14/18084, report completed May 23, 2014, Mailed Jun 10, 2014, 12 Pgs.

International Search Report and Written Opinion for International Application PCT/US14/18116, report completed May 13, 2014, Mailed Jun. 2, 2014, 12 Pgs.

International Search Report and Written Opinion for International Application PCT/US14/22774 report completed Jun. 9, 2014, Mailed Jul. 14, 2014, 6 Pgs.

International Search Report and Written Opinion for International Application PCT/US14/25904 report completed Jun. 10, 2014, Mailed Jul. 10, 2014, 6 Pgs.

International Search Report and Written Opinion for International Application PCT/US2010/057661, completed Mar. 9, 2011, 14 pgs.

International Search Report and Written Opinion for International Application PCT/US2014/024947, Report Completed Jul. 8, 2014, Mailed Aug 5, 2014, 8 Pgs.

International Search Report and Written Opinion for International Application PCT/US2014/028447, report completed Jun. 30, 2014, Mailed Jul. 21, 2014, 8 Pgs.

International Search Report and Written Opinion for International Application PCT/US2014/064693, Report Completed Mar. 7, 2015, Mailed Apr. 2, 2015, 15 pgs.

International Search Report and Written Opinion for International Application PCT/US2014/066229, Search Completed Mar. 6, 2015, Mailed Mar. 19, 2015, 9 Pgs.

International Search Report and Written Opinion for International Application PCT/US2014/067740, Report Completed Jan. 29, 2015, Mailed Mar. 3, 2015, 10 pgs.

Chen et al., "KNN Matting", IEEE Transactions on Pattern Analysis and Machine Intelligence, Sep. 2013, vol. 35, No. 9, pp. 2175-2188.

Lai et al., "A Large-Scale Hierarchical Multi-View RGB-D Object Dataset", May 2011, 8 pgs.

Lee et al., "Electroactive Polymer Actuator for Lens-Drive Unit in Auto-Focus Compact Camera Module", ETRI Journal, vol. 31, No. 6, Dec. 2009, pp. 695-702.

Levin et al., "A Closed Form Solution to Natural Image Matting", Pattern Analysis and Machine Intelligence, Feb. 2008, vol. 30, 8 pgs.

Merkle, Philipp et al., "Adaptation and optimization of coding algorithms for mobile 3DTV", Mobile3DTV Project No. 216503, Nov. 2008, 55 pgs.

Mitra et al., "Light Field Denoising, Light Field Superresolution and Stereo Camera Based Refocussing using a GMM Light Field Patch Prior", Computer Vision and Pattern Recognition Workshops (CVPRVV), 2012 IEEE Computer Society Conference on Jun. 16-21, 2012, pp. 22-28.

Perwass et al., "Single Lens 3D-Camera with Extended Depth-of-Field", printed from www.raytrix.de, Jan. 2012, 15 pgs.

Philips 3D Solutions, "3D Interface Specifications, White Paper", Philips 3D Solutions retrieved from www.philips.com/3dsolutions, 29 pgs., Feb. 15, 2008.

Pouydebasquea et al., "Varifocal liquid lenses with integrated actuator, high focusing power and low operating voltage fabricated on 200 mm wafers", Sensors and Actuators A: Physical, vol. 172, Issue 1, Dec. 2011, pp. 280-286.

Tallon et al., "Upsampling and Denoising of Depth Maps Via Joint-Segmentation", 20th European Signal Processing Conference, Aug. 27-31,2012, 5 pgs.

Yang et al., "A Real-Time Distributed Light Field Camera", Eurographics Workshop on Rendering (2002), pp. 1-10.

* cited by examiner

SYSTEMS AND METHODS FOR THE MANIPULATION OF CAPTURED LIGHT FIELD IMAGE DATA

CROSS-REFERENCE TO RELATED APPLICATIONS

This application claims the benefit of U.S. Provisional Patent Application No. 61/601,413, filed on Feb. 21, 2012, the disclosure of which is hereby incorporated by reference in its entirety.

FIELD OF THE INVENTION

The present invention generally relates to the manipulation of images; specifically the manipulation of captured light field image data and synthesized high resolution images.

BACKGROUND OF THE INVENTION

Imaging devices, such as cameras, can be used to capture images of portions of the electromagnetic spectrum, such as the visible light spectrum, incident upon an image sensor. For ease of discussion, the term light is generically used to cover radiation across the entire electromagnetic spectrum. In a typical imaging device, light enters through an opening (aperture) at one end of the imaging device and is directed to an image sensor by one or more optical elements such as lenses. The image sensor includes pixels or sensor elements that generate signals upon receiving light via the optical element. Commonly used image sensors include charge-coupled device (CCDs) sensors and complementary metal-oxide semiconductor (CMOS) sensors.

Image sensors are devices capable of converting an optical image into a digital signal. Image sensors utilized in digital cameras are typically made up of an array of pixels; the number of pixels determines the megapixel rating of the image sensor. For example, an image sensor having a width× height of 2272×1704 pixels would have an actual pixel count of 3,871,488 pixels and would be considered a 4 megapixel image sensor. Each pixel in an image sensor is capable of capturing light and converting the captured light into electrical signals. In order to separate the colors of light and capture a color image, a Bayer filter is often placed over the image sensor, filtering the incoming light into its red, blue, and green (RGB) components that are then captured by the image sensor. The RGB signal captured by the image sensor using a Bayer filter can then be processed and a color image can be created.

In photography, depth of field is the distance between the nearest and farthest objects in a picture that appears acceptably sharp. Depending on the desire of the photographer, it can be desirable to have the entire image be sharp, in which case a large depth of field is desired. Conversely, a small depth of field will emphasize certain aspects of a picture (that will appear sharp) while de-emphasizing the other aspects of the picture (that will appear out of focus). When taking pictures, the size of the image sensor corresponds to the depth of field of the image captured by the image sensor, with smaller sensors having a larger depth of field. Alternately, a variable aperture in front of the lens adjusts to vary the depth of field captured—a smaller aperture enabling a larger depth of field and vice versa. Cellular telephones are often equipped with a small digital camera, often employing an image sensor around 4 mm. This gives cellular telephone cameras a large depth of field. For comparison, an image sensor in a DSLR camera typically measures between 18 mm and 36 mm, giving a DSLR a smaller depth of field than a cellular telephone camera. This is assuming that both the DSLR and the cellular telephone camera have maximal aperture settings for the captured photographs.

SUMMARY OF THE INVENTION

Systems and methods for the manipulation of captured light fields and captured light field image data in accordance with embodiments of the invention are disclosed. In one embodiment of the invention, a system for manipulating captured light field image data includes a processor, a display connected to the processor and configured to display images, a user input device connected to the processor and configured to generate user input data in response to user input, and a memory connected to the processor and configured to store captured light field image data and an image manipulation application, wherein the captured light field image data includes image data, pixel position data, and a depth map, wherein the depth map includes depth information for one or more pixels in the image data, and wherein the image manipulation application configures the processor to display a first synthesized image based on the image data using the display, receive user input data identifying at least one pixel identifying a region within the first synthesized image using the user input device, determine boundary data for the identified region using the depth map, where the boundary data describes the edges of the identified region, receive user input data identifying at least one action to be performed using the user input device, where the action to be performed includes an image processing operation, and perform the received action using the boundary data and the captured light field image data.

In another embodiment of the invention, the image data in the captured light field image data is the first synthesized image.

In an additional embodiment of the invention, the image data in the captured light field image data is a low resolution image, the pixel position data describes pixel positions for alternative view image pixels corresponding to specific pixels within the image data, and the image manipulation application configures the processor to synthesize the first image using the image data, the pixel position data, and the depth map.

In yet another additional embodiment of the invention, the image manipulation application configures the processor to detect an object in the first synthesized image using the boundary data and the depth map, where an object is a set of adjacent pixels in a synthesized image related based on corresponding depth information in the depth map.

In still another additional embodiment of the invention, the image manipulation application further configures the processor to obtain object data based on the detected object, generate captured light field image metadata using the requested search data, and associate the captured light field image metadata with the pixels corresponding to the identified object in the image data.

In yet still another additional embodiment of the invention, the object data is received from a third party information server system separate and remote from the image manipulation device.

In yet another embodiment of the invention, the received action is a refocus action and the image manipulation application further configures the processor to perform the received action by synthesizing a second image using a synthetic aperture in the captured light field image data having a focal plane placed at the depth corresponding to the depth map of the pixels within the determined boundary data.

In still another embodiment of the invention, the input device is a gaze tracking device configured to generate input data identifying at least one pixel identifying a region within the first synthesized image based on the detection of a gaze input and the focal plane of the first synthesized image is placed at a depth corresponding to the generated input data.

In yet still another embodiment of the invention, the input device is a touchscreen device configured to generate input data identifying at least one pixel identifying a region within the first synthesized image based on received touch input data and the focal plane is placed at a depth corresponding to the depth of the region in the first synthesized image corresponding to the generated input data.

In yet another additional embodiment of the invention, the received action is a bokeh modification action including blur modification data and the image manipulation program further configures the processor to perform the received action by identifying the focal plane of the first synthesized image using the boundary data, and synthesizing a second image using the identified focal plane, the blur modification data, and the captured light field image data.

In still another additional embodiment of the invention, the captured light field image data further includes captured light field metadata associated with at least one pixel in the captured light field image data the received action is a metadata retrieval action and the image manipulation application further configures the processor to perform the received action by determining at least one pixel in the image data corresponding to the boundary data in the synthesized image, retrieving the captured light field metadata associated with the determined at least one pixel, and displaying the retrieved metadata using the display.

In yet still another additional embodiment of the invention, the received action is selected from the group consisting of a cut action, a copy action, a paste action, and a recoloring action, where the received action is performed as a function of the depth map associated with the captured light field image data.

Still another embodiment of the invention includes a method for manipulating captured light field image data including obtaining captured light field image data using an image manipulation device, where the captured light field image data includes image data, pixel position data, and a depth map, displaying a first synthesized image based on the image data using the image manipulation device, receiving user input data identifying at least one pixel identifying a region within the first synthesized image using the image manipulation device, determining boundary data for the identified region based on the depth map using the image manipulation device, where the boundary data describes the edges of the identified region and the depth map includes depth information for one or more pixels in the image data, receiving user input data identifying at least one action to be performed using the image manipulation device, where the action to be performed includes an image processing operation, and performing the received action based on the boundary data and the captured light field image data using the image manipulation device.

In yet another additional embodiment of the invention, the image data in the captured light field image data is the first synthesized image.

In still another additional embodiment of the invention, manipulating captured light field image data further includes synthesizing the first image based on the image data, the pixel position data, and the depth map using the image manipulation device, wherein the image data in the captured light field image data is a low resolution image and the pixel position data describes pixel positions for alternative view image pixels corresponding to specific pixels within the image data.

In yet still another additional embodiment of the invention, manipulating captured light field image data further includes detecting an object in the first synthesized image based on the boundary data and the depth map using the image manipulation device, where an object is a set of adjacent pixels in a synthesized image related based on corresponding depth information in the depth map.

In yet another embodiment of the invention, manipulating captured light field image data further includes obtaining object data based on the detected object using the image manipulation device, generating captured light field image metadata based on the requested search data using the image manipulation device, and associating the captured light field image metadata with the pixels corresponding to the identified object in the image data using the image manipulation device.

In still another embodiment of the invention, manipulating captured light field image data further includes receiving object data from a third party information server system separate and remote from the image manipulation device using the image manipulation device.

In yet still another embodiment of the invention, manipulating captured light field image data further includes performing the received action by synthesizing a second image using a synthetic aperture in the captured light field image data having a focal plane placed at the depth corresponding to the depth map of the pixels within the determined boundary data using the image manipulation device.

In yet another additional embodiment of the invention, manipulating captured light field image data further includes generating input data using the image manipulation device by identifying at least one pixel identifying a region within the first synthesized image based on the detection of a gaze input received from a gaze tracking device in the image manipulation device and placing the focal plane of the second synthesized at a depth corresponding to the generated input data using the image manipulation device.

In still another additional embodiment of the invention, manipulating captured light field image data further includes generating input data using the image manipulation device by identifying at least one pixel identifying a region within the first synthesized image based on the detection of a touch input received via a touchscreen device in the image manipulation device and placing the focal plane of the second synthesized at a depth corresponding to the generated input data using the image manipulation device.

In yet still another additional embodiment of the invention, manipulating captured light field image data further includes identifying the focal plane of the first synthesized image using the boundary data and synthesizing a second image based on the identified focal plane, the blur modification data, and the captured light field image data using the image manipulation device, where the blur modification data affects the bokeh of the second synthesized image.

In yet another embodiment of the invention, manipulating captured light field image data further includes determining at least one pixel in the captured light field image data corresponding to the boundary data in the synthesized image using the image manipulation device, retrieving captured light field metadata associated with the determined at least one pixel in the image data using the image manipulation device, and displaying the retrieved metadata using the image manipulation device.

In still another embodiment of the invention, the received action is selected from the group consisting of a cut action, a copy action, a paste action, and a recoloring action and performing the received action using the image manipulation device is based on the depth map associated with the captured light field image data.

DETAILED DESCRIPTION

Figure 1:
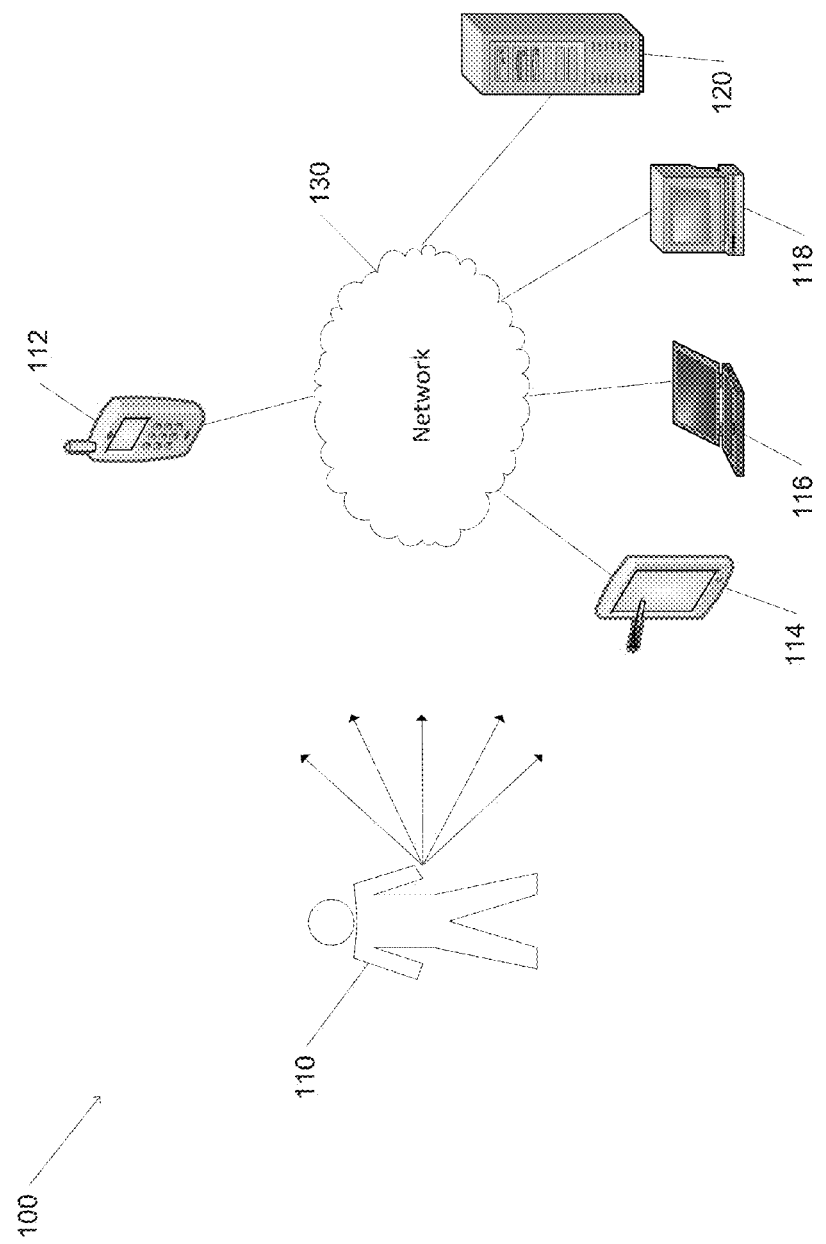
FIG. 1 is a system overview of systems capable of manipulating captured light field image data and synthesized high resolution images in accordance with an embodiment of the invention.

Turning now to the drawings, systems and methods for manipulating captured light field image data and synthesized high resolution images in accordance with embodiments of the invention are illustrated. Array cameras, such as those described in U.S. patent application Ser. No. 12/935,504, entitled "Capturing and Processing of Images using Monolithic Camera Array with Heterogeneous Imagers" to Venkataraman et al., can be utilized to capture light fields and store the captured light fields. The entirety of U.S. patent application Ser. No. 12/935,504 is hereby incorporated by reference. Captured light fields contain image data from a two dimensional array of images of a scene captured from multiple points of view so that each image samples the light field of the same region within the scene (as opposed to a mosaic of images that sample partially overlapping regions of a scene). In a variety of embodiments, image data for a specific image that forms part of captured light field describes a two dimensional array of pixels.

Each image in a captured light field is from a different viewpoint. Due to the different viewpoint of each of the images, parallax results in variations in the position of foreground objects within the images of the scene. The disparity between corresponding pixels in images in a captured light field can be utilized to determine the distance to an object imaged by the corresponding pixels. Processes that can be utilized to detect parallax and generate depth maps in accordance with embodiments of the invention are disclosed in U.S. Provisional Patent Application No. 61/691,666 entitled "Systems and Methods for Parallax Detection and Correction in Imaged Captured Using Array Cameras" to Venkataraman et al, the entirety of which is hereby incorporated by reference. A depth map is metadata describing the distance from the viewpoint from which an image is captured (or in the case of super-resolution processing synthesized) with respect to objects imaged by pixels within the image.

In a number of embodiments, captured light field image data is generated using a captured light field. In many embodiments, captured light field image data includes one or more low resolution reference images taken from the captured light field, a depth map for each reference image, and a set of prediction error images describing the pixel positions within one or more alternate view images in the captured light field that correspond to specific pixels within the reference image based on the generated depth. The use of prediction error images to achieve compression of a captured light field is disclosed in U.S. Provisional Application Ser. No. 61/767,520, titled "Systems and Methods for Generating Captured Light Field Image Data using Captured Light Fields" to Lelescu et al., the disclosure of which is incorporated herein by reference in its entirety. In a variety of embodiments, captured light field image data includes a high resolution image synthesized using the captured light field and metadata describing the positions of pixels in the captured light field that are occluded from the viewpoint of the synthesized high resolution image and a depth map for the synthesized high resolution image. Systems and methods for synthesizing high resolution images using captured light field image data in accordance with embodiments of the invention are disclosed in U.S. patent application Ser. No. 12/967,807, titled "System and Methods for Synthesizing High Resolution Images Using Super-Resolution Processes" to Lelescu et al., the entirety of which is hereby incorporated by reference. In a number of embodiments, the metadata can also include additional information including (but not limited to) auxiliary maps such as confidence maps, edge maps, and missing pixel maps that can be utilized during post processing of the encoded image to improve the quality of an image rendered using the light field image data file. A variety of file formats can be utilized to store captured light field image data and any associated metadata in accordance with embodiments of the invention. One such file format is the JPEG-DX extension to ISO/IEC 10918-1 described in U.S. patent application Ser. No. 13/631,731, titled "Systems and Methods for Encoding Light Field Image Files" and filed Sep. 28, 2012, the entirety of which is hereby incorporated by reference.

Using the information contained in the captured light field image data, high resolution images synthesized using the captured light field image data can be manipulated in a variety of ways not possible with an image taken using a traditional camera. Additionally, synthesized images that are not generated using a super-resolution process (such as a two-dimensional or three-dimensional collapse of the image data stored in the captured light field image data) along with associated depth information can be utilized in accordance with embodiments of the invention. Objects can be detected (or identified) and selected in the synthesized high resolution images in a variety of manners in accordance with embodiments of the invention, including utilizing the depth information along with color and intensity values. Once an object is selected, many image processing operations, such as copy, paste, recoloring, and scaling, can be applied to the object. Additionally, searches involving the object can be performed utilizing various image searching techniques. By changing the focal point used to synthesize a high resolution image from the captured light field image data, the synthesized high resolution image can be refocused; this allows users to create different views of the captured light field image data. Additionally, user-generated metadata can be associated with a point, region, or object, stored with the captured light field image data and/or with synthesized high resolution images. A variety of user interfaces can be utilized to interact with captured light field image data and/or synthesized high resolution images. In a number of embodiments, devices capable of manipulating captured light field image data and/or synthesized high resolution images employ touchscreen-based interfaces. By utilizing touchscreen-based interfaces, users can select objects and/or points in order to modify selected objects and/or areas, adjust the focus of the image, and/or view metadata associated with the image.

Although several techniques for manipulating captured light field image data and synthesized high resolution images are described above, other techniques in accordance with embodiments of the invention can be utilized by those skilled in the art, particularly those techniques which synthesize high resolution images and manipulate those images using captured light fields. Systems and methods for manipulating captured light field image data and synthesized high resolution images in accordance with embodiments of the invention are described below.

System Overview

Users interact with a variety of devices when manipulating captured light field image data and/or synthesized high resolution images. Using these devices, users can capture, modify, and/or share light field image data. A conceptual illustration of a system for user interactions with devices capable of manipulating captured light field image data and/or synthesized high resolution images in accordance with embodiments of the invention is illustrated in FIG. 1. The system 100 includes a user 110 who uses one or more of a variety of devices, including smartphones 112, tablets 114, personal computers 116, picture kiosks 118, and servers 120. In several embodiments, the devices capable of interacting with captured light field image data and synthesized high resolution images employ touch screen interfaces and/or 3D display capabilities (auto-stereoscopic displays). In a number of embodiments, devices capable of interacting with captured light field image data and synthesized high resolution images include a front-facing camera and/or an array camera, where the front-facing camera is capable of tracking user movements and the array camera is capable of capturing captured light field image data. In several embodiments, the front-facing camera is also an array camera.

In many embodiments, the devices are capable of communication across a network 130 such as the Internet. Devices capable of manipulating captured light field image data and synthesized high resolution images use the network 130 to transfer captured light field image data and/or synthesized high resolution images to other devices for further manipulation, viewing, or sharing. In a number of embodiments, the sharing of captured light field image data and/or synthesized high resolution images occurs utilizing photo sharing services, such as the Flickr service provided by Yahoo!, Inc. of Santa Clara, Calif., and/or social networks, such as the Facebook service provided by Facebook, Inc. of Menlo Park, Calif. and the Twitter service provided by Twitter, Inc. of San Francisco, Calif.

Although specific devices are described above with respect to FIG. 1, any device capable of manipulating a captured light field image data and synthesized high resolution images, including devices only capable of displaying synthesized high resolution images and devices with capabilities not discussed above, can be used in accordance with embodiments of the invention. Systems and methods for manipulating captured light field image data and synthesized high resolution images in accordance with embodiments of the invention are discussed further below.

Devices Capable of Manipulating Captured Light Field Image Data

Figure 2:
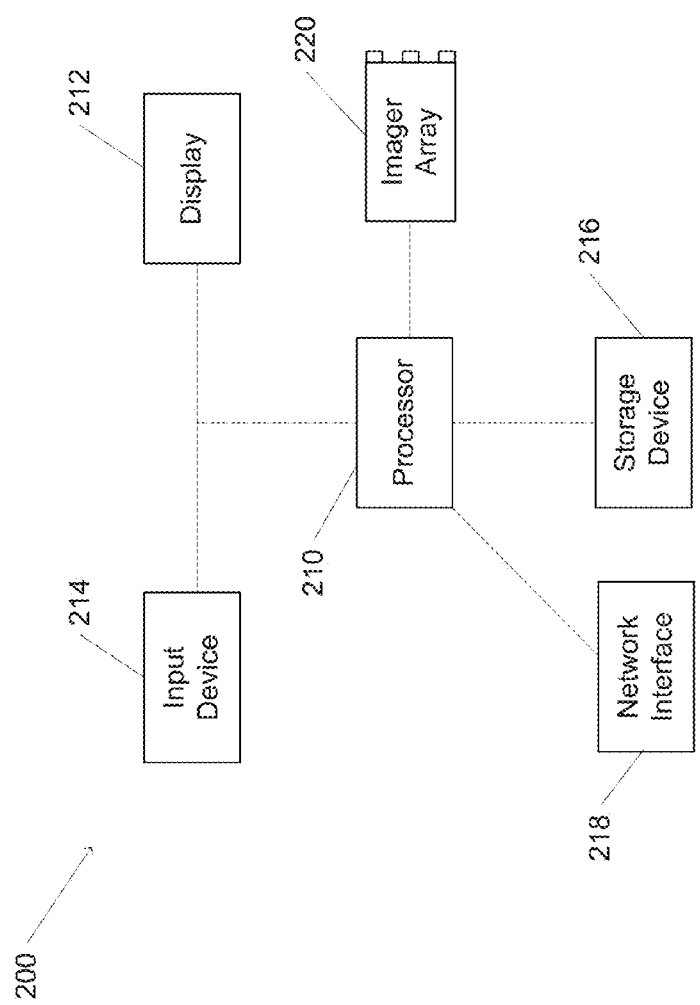
FIG. 2 is a diagram illustrating a device capable of processing captured light field image data and synthesized high resolution images in accordance with an embodiment of the invention.

Users can utilize a variety of image manipulation devices to manipulate captured light field image data and high resolution images using the captured light field image data. Many of these devices are also capable of capturing light fields and storing the captured light field image data. A diagram of an image manipulation device capable of manipulating captured light field image data and synthesized high resolution images is illustrated in FIG. 2. The device 200 contains a processor 210 capable of being configured via software to synthesize high resolution images and load and manipulate captured light field image data and/or synthesized high resolution images. In many embodiments of the invention, the processor 210 is connected to an imager array 220 capable of capturing light fields. In a variety of embodiments, the imager array 220 is configured to capture light field image data using a plurality of active focal planes in a camera module including an imager array and an optic array of lens stacks, where each focal plane included a plurality of rows of pixels that also form a plurality of columns of pixels and each focal plane is contained within a region of the imager array that does not contain pixels from another focal plane, where an image is formed on each active focal planes by a separate lens stack in said optic array of lens stacks. In accordance with a number of embodiments, an array camera includes the processor 210 and the imager array 220.

In many embodiments, the processor is connected to a display 212 capable of displaying synthesized high resolution images. In several embodiments, the display 212 is capable of displaying synthesized high resolution 3D images. In a number of embodiments, the processor 210 is connected to an input device 214, such as a touchscreen interface, a pointing device, and/or a keyboard. In several embodiments, the input device 214 can be a camera or array camera capable of tracking user movements. Other devices not specifically listed above can be utilized as the display 212 and/or the input device 214 in accordance with the requirements of embodiments of the invention.

In many embodiments, the processor 210 is connected to a storage device 216. The storage device 216 is capable of storing captured light field image data and/or synthesized high resolution images and delivering the captured light field image data and/or images to the processor 210 for manipulation. In a number of embodiments, the processor 210 is connected to a network interface 218 capable of communication via a network. The network communication involves receiving and transmitting captured light field image data and/or synthesized high resolution images, where the captured light field image data and/or synthesized high resolution images can be stored in storage device 216 (if present) or can be loaded directly into the processor 210. In several embodiments, the storage device 216 is configured to store an image manipulation application that configures the processor 210 to load captured light field image data, control the rendering of synthesized high resolution images, and/or manipulate the light field image data and/or synthesized high resolution images.

Although a specific device capable of manipulating captured light field image data and synthesized high resolution images is described above with respect to FIG. 2, any device capable of manipulating captured light field image data and/or synthesized high resolution images can be used in accordance with embodiments of the invention. Processes for manipulating captured light field image data and synthesized high resolution images in accordance with embodiments of the invention are discussed further below.

Manipulation of Synthesized High Resolution Images

Figure 3:
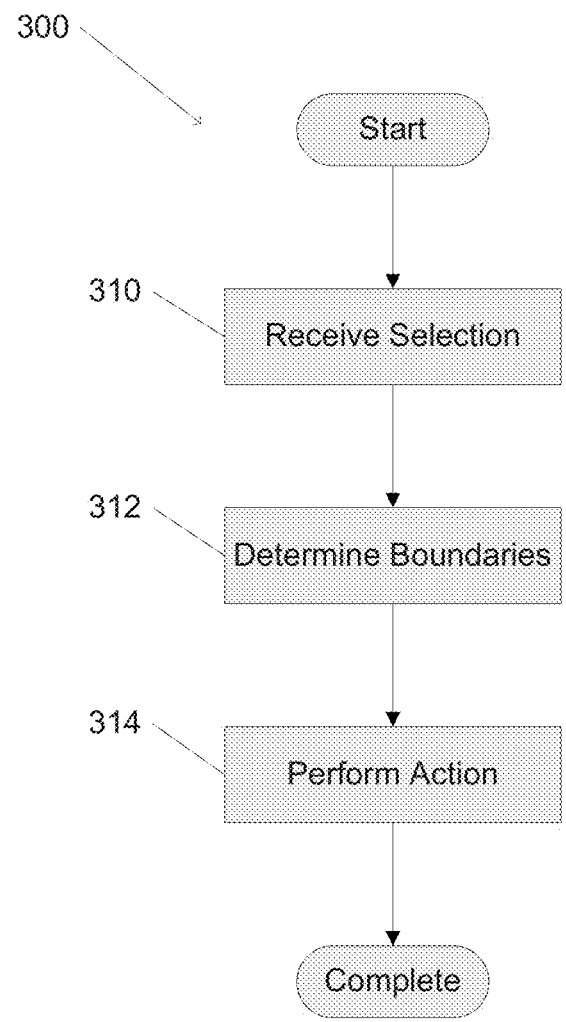
FIG. 3 is a flow chart illustrating a process for refocusing synthesized high resolution images in accordance with an embodiment of the invention.

Users often manipulate captured images in order to fix problems with the original image or to add further artistic flourishes to the image. By utilizing the additional information contained in captured light field image data, users can manipulate synthesized high resolution images in a variety of ways not possible with images captured using a traditional camera. A process for manipulating synthesized high resolution images is illustrated in FIG. 3. The process 300 involves receiving (310) a selection. In many embodiments of the invention, the selection can be a point of a synthesized high resolution image. In several embodiments, the selection can be an object detected in a synthesized high resolution image and/or captured light field image data. In a number of embodiments, the selection can be a region of interest in the synthesized high resolution images. For example, a region of interest can be a rectangle drawn using two fingers on a touchscreen interface, although any region can be utilized in accordance with the requirements of embodiments of the invention.

The boundaries of the selected object(s) and/or region are determined (312). In a variety of embodiments, the selected object(s) and/or region in the received (310) selection are utilized as the determined (312) boundaries. In many embodiments, the software controlling the rendering of synthesized high resolution images utilizes the depth information of the selection along with color and intensity values to determine (312) the boundaries of solid objects present in the synthesized high resolution image. In several embodiments, the depth information of the selection is used along with clustering, grouping, and/or edge detection algorithms to detect objects in the synthesized high resolution image, the captured light field image data, and/or the selected region; the edges of the objects are the determined (312) boundaries.

Actions can be performed (314) on objects and/or selected regions. In a number of embodiments, the actions performed (314) include modifying object metadata associated with the object and/or region. Object metadata includes a variety of data describing the object and/or region, such as the color(s) of the solid object, the size of the objection and/or region, and the depth of the object and/or region. In a number of embodiments, recoloring an object/and or region includes modifying the color values and/or the transparency values of one or more pixels in the object and/or selected region based on the depth of the pixels. In a variety of embodiments, recoloring an object/and or region includes modifying the brightness and/or the luminosity of one or more pixels in the object and/or selected region based on the depth of the pixels. For example, only pixels below (or above) a particular depth have the color values adjusted. In several embodiments, the actions performed (314) are any image manipulations capable of being performed using image manipulation software, such as those operations available in Adobe Photoshop by Adobe Systems of Mountain View, Calif. Additionally, other actions can be performed (314), such as cutting, copying, and pasting the detected object(s), in accordance with a variety of embodiments of the invention. Many embodiments utilize image searching techniques known to those skilled in the art to search for the selected object(s) in a variety of sources, such as other synthesized high resolution images and/or traditional images; this enables users to locate other sources containing information that the user find relevant and/or interesting.

Specific processes for manipulating synthesized high resolution images are described above with respect to FIG. 3; however, a variety of processes for manipulating synthesized images can be utilized in accordance with embodiments of the invention. Further processes for manipulating synthesized high resolution images are discussed further below.

Refocusing Synthesized High Resolution Images

Figure 4:
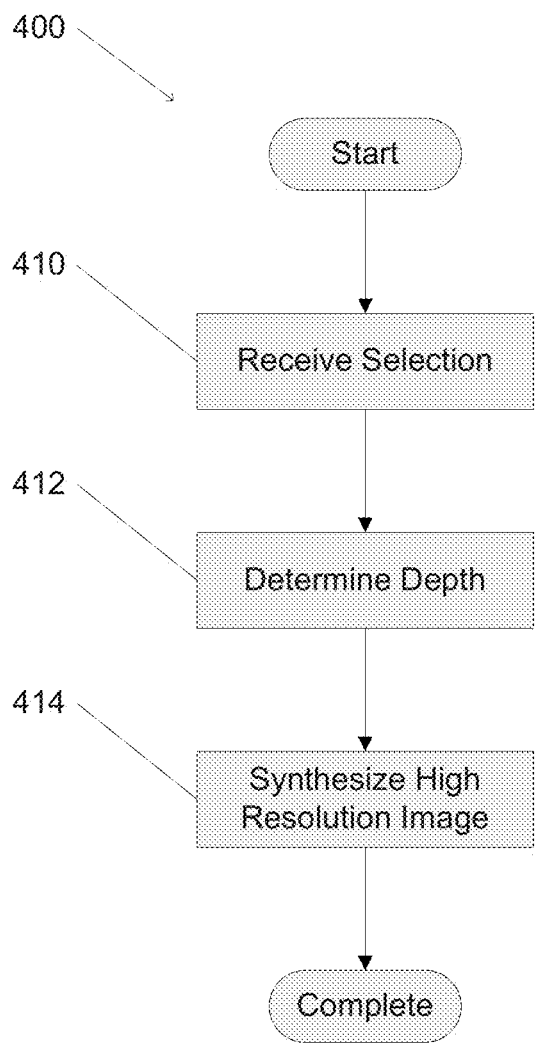
FIG. 4 is a flow chart illustrating a process for manipulating synthesized high resolution images in accordance with an embodiment of the invention.

Once an image is taken with a traditional camera, the depth of field and focus of the image are fixed. However, high resolution images synthesized using captured light field image data do not share this limitation. Image manipulation devices in accordance with a variety of embodiments include a user interface configured to enable a user to manipulate a synthesized high resolution image by defining a focal plane for the synthesized high resolution image and/or adjust the bokeh of the synthesized high resolution image. A process for refocusing a synthesized high resolution image in accordance with an embodiment of the invention is illustrated in FIG. 4. The process 400 involves receiving (410) a selection of an area in a synthesized high resolution image. In many embodiments, the received (410) selection is a point of the synthesized high resolution image. In several embodiments, the received (410) selection is an object in the synthesized high resolution image. In a number of embodiments, the received (410) selection is a region of interest in the synthesized high resolution image.

Depth is determined (412). In a variety of embodiments, the location of the received (410) selection is used by the software controlling the rendering of the synthesized high resolution image to determine (412) the depth of the received (410) selection. In many embodiments, the depth is determined (412) using the captured light field image data from which the high resolution image was synthesized.

A refocused high resolution image is synthesized (414). In a number of embodiments, the refocused high resolution image is synthesized (414) using a synthetic aperture having its focal plane placed at the depth corresponding to the received (410) selection along with the depth of field. In several embodiments, the depth of field is obtained in one or more ways, such as utilizing the depth of field of the original synthesized high resolution image, setting the depth of field to a default value, using a user-provided depth of field, and/or utilizing a depth of field determined using the captured light field image data. Other methods of obtaining the depth of field can be used in accordance with embodiments of the invention. In many embodiments, the bokeh of the refocused synthesized (414) high resolution image is adjustable. In a variety of embodiments, the bokeh of the refocused synthesized (414) high resolution image is the aesthetic quality of the blurred areas of the refocused synthesized (414) high resolution image.

In a number of embodiments, receiving (410) a selection involves tracking the portion of the synthesized high resolution image where the user is gazing utilizing eyeball and/or gaze tracking techniques. The determination of depth (412) of the point where the user is gazing and synthesizing (414) updated high resolution images are performed using the received (410) location where the user is focused and are dynamically adjusted as the user gazes at different parts of the synthesized high resolution image.

Although a specific process for refocusing synthesized high resolution images is described above with respect to FIG. 4, a variety of processes, including those that refocus synthesized images, can be utilized in accordance with embodiments of the invention. More processes for manipulating synthesized high resolution images are described below.

Manipulating Metadata Associated with Captured Light Field Image Data

Figure 5:
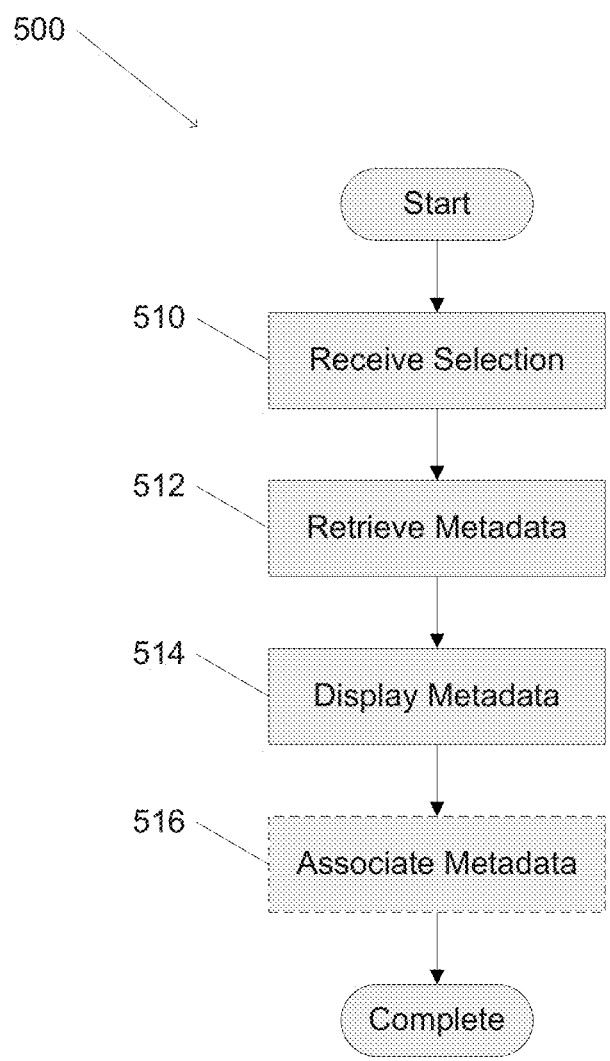
FIG. 5 is a flow chart illustrating a process for manipulating metadata associated with captured light fields and captured light field image data in accordance with an embodiment of the invention.

An image is worth a thousand words, however, in many cases, it is useful to associate metadata with the picture in order to capture additional data related to specific aspects of the image. Image manipulation devices in accordance with embodiments of the invention are configured to associate and manipulate metadata with synthesized high resolution images and/or captured light field data. A process for manipulating metadata associated with a captured light field image data is illustrated in FIG. 5. The process 500 involves receiving (510) a selection. In many embodiments of the invention, the selection can be a point of a synthesized high resolution image. In several embodiments, the selection can be an object in a synthesized high resolution image. In a number of embodiments, the selection can be a region of interest in the synthesized high resolution image.

The selection is provided to the software controlling the rendering of the synthesized high resolution image and available metadata associated with the selection is retrieved (512). In a variety of embodiments, the metadata is retrieved (512) from the synthesized high resolution image. In several embodiments, the metadata is retrieved (512) using the portion of the captured light field image data corresponding to the received (510) selected area of the synthesized high resolution image. Metadata, if available, is displayed (514). Displaying (514) metadata can be performed in a variety of ways, including, but not limited to, an overlay on top of the synthesized high resolution image and a separate dialog box. Other techniques for displaying (514) metadata can be utilized in accordance with a number of embodiments.

In many embodiments, metadata can be associated (516) with the synthesized high resolution image and/or the captured light field image data. In several embodiments, the association (516) of metadata involves editing the retrieved (512) metadata. The metadata associated (516) with a captured light field image data includes text data, audio data, video data, image data, location data, or any other form of data in accordance with the requirements of embodiments of the invention. In a number of embodiments, the associated (516) metadata is received as input from a user. In many embodiments, the associated (516) metadata is received using an application. In a variety of embodiments, metadata is received from external data sources. For example, an image manipulate device can retrieve data from an external database, such as the Wikipedia service from the Wikimedia Foundation of San Francisco, Calif., and include the retrieved data in the metadata associated (516) with the synthesized high resolution image and/or the captured light field image data.

A specific process for manipulating metadata associated with a captured light field image data and/or a synthesized high resolution image is described above with respect to FIG. 5; however, a variety of processes, including those that manipulate synthesized images, in accordance with embodiments of the invention can be utilized to manipulate metadata.

Although the present invention has been described in certain specific aspects, many additional modifications and variations would be apparent to those skilled in the art. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A system for manipulating captured light field image data, comprising:
   a processor;
   a display connected to the processor and capable of displaying images;
   a user input device connected to the processor and capable of generating user input data in response to user input; and
   a memory connected to the processor and storing captured light field image data and an image manipulation application;
   wherein the captured light field image data comprises image data, pixel position data, and a depth map;
   wherein the depth map comprises depth information for one or more pixels in the image data; and
   wherein the image manipulation application directs the processor to:
      display a first synthesized image based on the image data using the display;
      receive user input data identifying at least one pixel identifying a region within the first synthesized image using the user input device;
      determine boundary data for the identified region using the depth map, wherein:
         boundary data is determined by utilizing the depth information along with color and intensity data to determine at least one boundary at a particular depth within the first synthesized image; and
         the boundary data describes edges of at least one object within the identified region based on the depth of the pixels in the image data corresponding to the boundary data;
      receive user input data identifying at least one action to be performed using the user input device, where the action to be performed comprises an image processing operation utilizing the depth information; and
      perform the received action to the identified region using the boundary data and the captured light field image data.

2. The system of claim 1, wherein the image data in the captured light field image data is the first synthesized image.

3. The system of claim 1, wherein:
   the image data in the captured light field image data is a low resolution image;
   the pixel position data describes pixel positions for alternative view image pixels corresponding to specific pixels within the image data; and
   the image manipulation application directs the processor to synthesize the first image using the image data, the pixel position data, and the depth map.

4. The system of claim 1, wherein:
   the image manipulation application directs the processor to detect an object in the first synthesized image using the boundary data and the depth map by utilizing the depth information along with color and intensity data to determine the boundaries of at least one solid object within the first synthesized image; and
   a detected object comprises a set of adjacent pixels in the first synthesized image related based on corresponding depth information in the depth map and defined by the determined boundaries.

5. The system of claim 4, wherein the image manipulation application further directs the processor to:
   obtain object data based on the detected object;
   generate captured light field image metadata using the requested search data; and
   associate the captured light field image metadata with the pixels corresponding to the identified object in the image data.

6. The system of claim 5, wherein the object data is received from a third party information server system separate and remote from the image manipulation device.

7. The system of claim 1, wherein:
   the received action is a refocus action; and the image manipulation application further directs the processor to perform the received action by synthesizing a second image using a synthetic aperture in the captured light field image data having a focal plane placed at the depth corresponding to the depth map of the pixels within the determined boundary data.

8. The system of claim 7, wherein:
the input device is a gaze tracking device capable of generating input data identifying at least one pixel identifying a region within the first synthesized image based on the detection of a gaze input; and
the focal plane of the first synthesized image is placed at a depth corresponding to the generated input data.

9. The system of claim 7, wherein:
the input device is a touchscreen device capable of generating input data identifying at least one pixel identifying a region within the first synthesized image based on received touch input data; and
the focal plane is placed at a depth corresponding to the depth of the region in the first synthesized image corresponding to the generated input data.

10. The system of claim 1, wherein:
the received action is a bokeh modification action comprising blur modification data; and
the image manipulation program further directs the processor to perform the received action by:
identifying the focal plane of the first synthesized image using the boundary data; and
synthesizing a second image using the identified focal plane, the blur modification data, and the captured light field image data.

11. The system of claim 1, wherein:
the captured light field image data further comprises captured light field metadata associated with at least one pixel in the captured light field image data;
the received action is a metadata retrieval action; and
the image manipulation application further directs the processor to perform the received action by:
determining at least one pixel in the image data corresponding to the boundary data in the first synthesized image;
retrieving the captured light field metadata associated with the determined at least one pixel; and
displaying the retrieved metadata using the display.

12. The system of claim 1, wherein the received action is selected from the group consisting of a cut action, a copy action, a paste action, and a recoloring action, where the received action is performed as a function of the depth map associated with the captured light field image data.

13. A method for manipulating captured light field image data, comprising:
obtaining captured light field image data using an image manipulation device, where the captured light field image data comprises image data, pixel position data, and a depth map, wherein the depth map comprises depth information for one or more pixels in the image data;
displaying a first synthesized image based on the image data using the image manipulation device;
receiving user input data identifying at least one pixel identifying a region within the first synthesized image using the image manipulation device;
determining boundary data for the identified region based on the depth map using the image manipulation device, where the boundary data describes edges of at least one object within the identified region and the depth map comprises depth information for one or more pixels in the image data based on the depth of the pixels in the image data corresponding to the boundary data;
receiving user input data identifying at least one action to be performed using the image manipulation device, where the action to be performed comprises an image processing operation utilizing the depth map; and
performing the received action to the identified region based on the boundary data and the captured light field image data using the image manipulation device.

14. The method of claim 13, wherein the image data in the captured light field image data is the first synthesized image.

15. The method of claim 13, further comprising synthesizing the first image based on the image data, the pixel position data, and the depth map using the image manipulation device; wherein:
the image data in the captured light field image data is a low resolution image; and
the pixel position data describes pixel positions for alternative view image pixels corresponding to specific pixels within the image data.

16. The method of claim 13, further comprising detecting an object in the first synthesized image based on the boundary data and the depth map using the image manipulation device, where an object is a set of adjacent pixels in a synthesized image related based on corresponding depth information in the depth map.

17. The method of claim 16, further comprising:
obtaining object data based on the detected object using the image manipulation device;
generating captured light field image metadata based on the requested search data using the image manipulation device; and
associating the captured light field image metadata with the pixels corresponding to the identified object in the image data using the image manipulation device.

18. The method of claim 17, further comprising receiving object data from a third party information server system separate and remote from the image manipulation device using the image manipulation device.

19. The method of claim 13, further comprising:
performing the received action by synthesizing a second image using a synthetic aperture in the captured light field image data having a focal plane placed at the depth corresponding to the depth map of the pixels within the determined boundary data using the image manipulation device.

20. The method of claim 19, further comprising:
generating input data using the image manipulation device by identifying at least one pixel identifying a region within the first synthesized image based on the detection of a gaze input received from a gaze tracking device in the image manipulation device; and
placing the focal plane of the second synthesized at a depth corresponding to the generated input data using the image manipulation device.

21. The method of claim 19, further comprising:
generating input data using the image manipulation device by identifying at least one pixel identifying a region within the first synthesized image based on the detection of a touch input received via a touchscreen device in the image manipulation device; and
placing the focal plane of the second synthesized at a depth corresponding to the generated input data using the image manipulation device.

22. The method of claim 13, further comprising:
identifying the focal plane of the first synthesized image using the boundary data; and synthesizing a second image based on the identified focal plane, the blur modification data, and the captured light field image data using the image manipulation device, where the blur modification data affects the bokeh of the second synthesized image.

23. The method of claim 13, further comprising:

determining at least one pixel in the captured light field image data corresponding to the boundary data in the first synthesized image using the image manipulation device;

retrieving captured light field metadata associated with the determined at least one pixel in the image data using the image manipulation device; and displaying the retrieved metadata using the image manipulation device.

24. The method of claim 13, wherein:

the received action is selected from the group consisting of a cut action, a copy action, a paste action, and a recoloring action; and performing the received action using the image manipulation device is based on the depth map associated with the captured light field image data.

25. A system for manipulating captured light field image data, comprising:

a processor;

a display connected to the processor and capable of displaying images;

a user input device connected to the processor and capable of generating user input data in response to user input; and a memory connected to the processor and capable of storing captured light field image data and an image manipulation application;

wherein the captured light field image data comprises image data, pixel position data, and a depth map;

wherein the depth map comprises depth information for one or more pixels in the image data; and wherein the image manipulation application directs the processor to:

display a first synthesized image based on the image data using the display;

receive user input data identifying at least one pixel identifying a region within the first synthesized image using the user input device;

determine boundary data for the identified region using the depth map, where the boundary data describes edges of at least one object within the identified region based on the depth of the pixels in the image data corresponding to the boundary data;

receive user input data identifying at least one action to be performed using the user input device, where the action to be performed comprises a recoloring operation utilizing the depth map; and generate a second synthesized image based on the image data, the boundary data, the depth data, and the user input data, wherein the second synthesized image comprises at least one pixel having a color value differing from the corresponding pixel in the image data and the color of the at least one pixel in the second synthesized image is based on the depth of the at least one pixel.

26. A system for detecting objects in captured light field image data, comprising:

a processor; and a memory connected to the processor and storing captured light field image data and an image manipulation application;

wherein the captured light field image data comprises image data, pixel position data, and a depth map;

wherein the depth map comprises depth information for one or more pixels in the image data;

wherein the image data comprises a set of pixels, wherein a pixel comprises a set of color and a set of intensity data; and wherein the image manipulation application directs the processor to:

determine boundary data within the captured light field image data using the depth map, where the boundary data describes edges of at least one object within the identified region based on the depth of the pixels in the captured light field image data corresponding to the boundary data;

detect an object in the captured light field image data using the boundary data and the depth map by utilizing the depth information along with color and intensity data within the captured light field image data to determine the boundaries of at least one solid object within the first synthesized image, wherein a detected object comprises a set of adjacent pixels in the first synthesized image related based on corresponding depth information in the depth map and defined by the determined boundaries;

generate object metadata comprising the locations of the detected objects within the captured light field image data; and store the object metadata in the captured light field image data.

* * * * *